June 25, 1957     E. L. RANSEEN     2,797,346
ELECTRIC MOTORS
Filed July 16, 1954     7 Sheets-Sheet 1
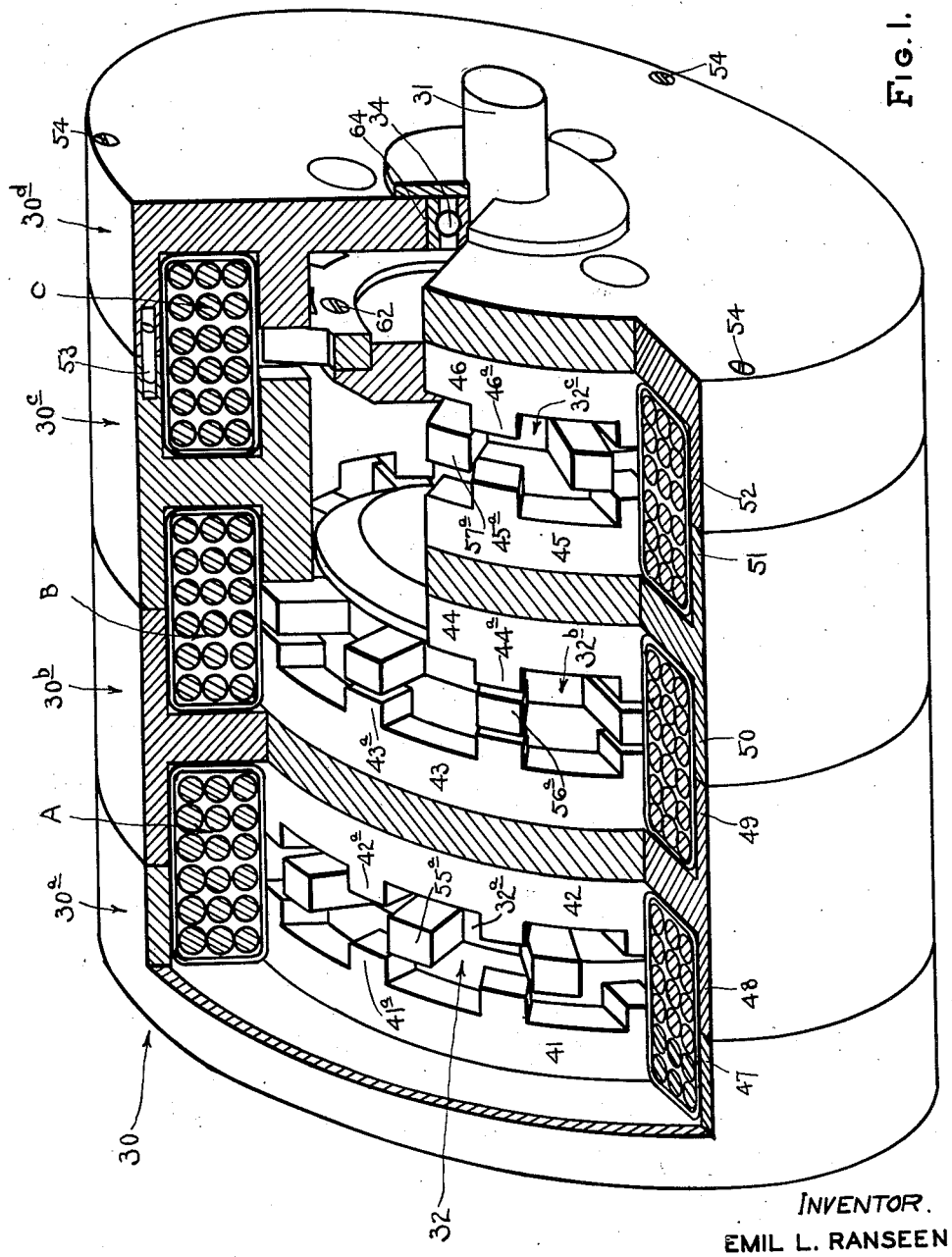
INVENTOR.
EMIL L. RANSEEN
Atty.

June 25, 1957  E. L. RANSEEN  2,797,346
ELECTRIC MOTORS
Filed July 16, 1954  7 Sheets-Sheet 2
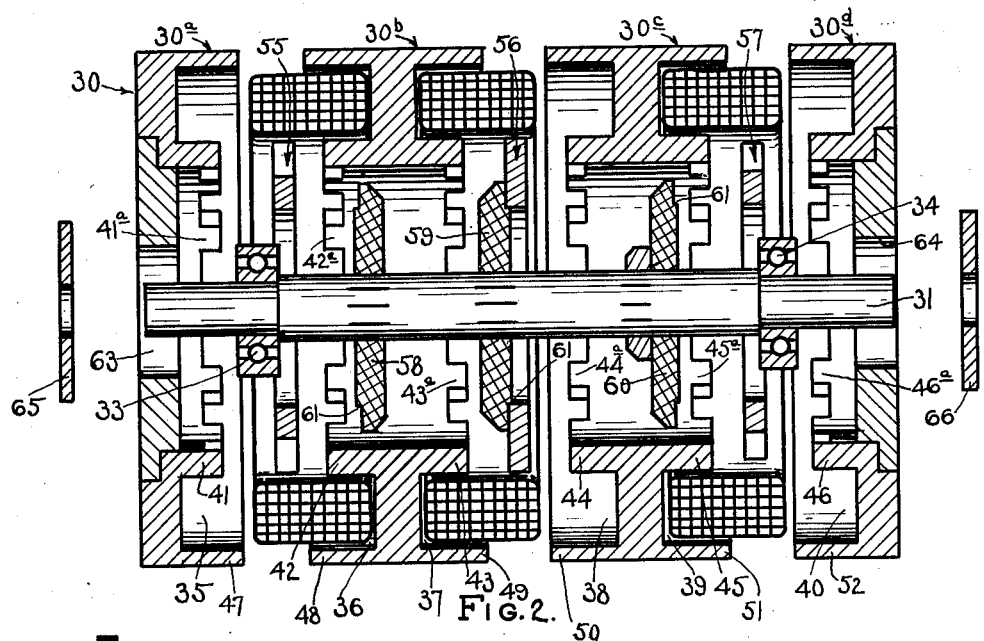
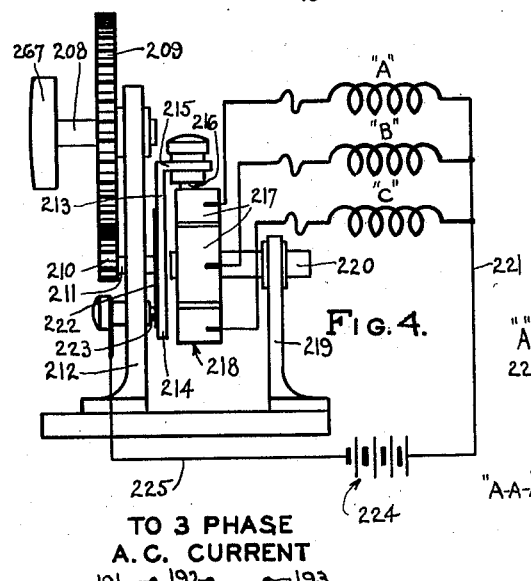
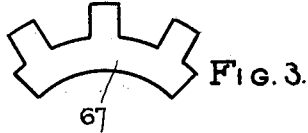
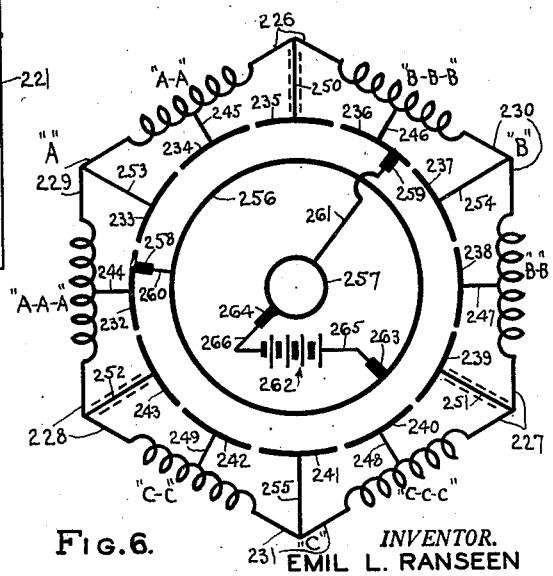
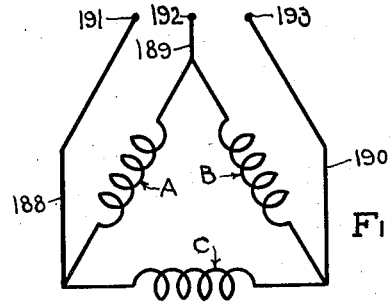
INVENTOR.
EMIL L. RANSEEN
BY
Atty.

June 25, 1957  E. L. RANSEEN  2,797,346
ELECTRIC MOTORS
Filed July 16, 1954  7 Sheets-Sheet 3

INVENTOR
EMIL L. RANSEEN
Atty.

June 25, 1957  E. L. RANSEEN  2,797,346
ELECTRIC MOTORS

Filed July 16, 1954 7 Sheets-Sheet 4

SECTION a

SECTION b

INVENTOR.
EMIL L. RANSEEN
Atty.

June 25, 1957  E. L. RANSEEN  2,797,346
ELECTRIC MOTORS

Filed July 16, 1954  7 Sheets-Sheet 5

INVENTOR.
EMIL L. RANSEEN
BY
Atty.

June 25, 1957　　　　E. L. RANSEEN　　　　2,797,346
ELECTRIC MOTORS

Filed July 16, 1954　　　　　　　　　　　　　　　7 Sheets-Sheet 6

INVENTOR
EMIL L. RANSEEN
by Thos. A. Banning Jr.
Atty.

June 25, 1957  E. L. RANSEEN  2,797,346
ELECTRIC MOTORS
Filed July 16, 1954  7 Sheets-Sheet 7

INVENTOR.
EMIL L. RANSEEN

United States Patent Office 2,797,346
Patented June 25, 1957

2,797,346

ELECTRIC MOTORS

Emil L. Ranseen, Chicago, Ill., assignor, by mesne assignments, to Agnes Jones Ranseen, trustee, Chicago, Ill.

Application July 16, 1954, Serial No. 443,798

30 Claims. (Cl. 310—46)

This invention relates to improvements in electric motors of the general type disclosed in Letters Patent of the United States, No. 2,343,325, issued March 7, 1944. For purposes of convenience and simplicity of designation I shall herein refer to motors of the general type to which said earlier patent refers, and which are disclosed herein as "stepping motors," but in so doing I do not intend to limit the disclosures of the present application, nor the protection to be afforded by the claims herein.

Generally speaking a principal object of the present invention is to provide improvements in such motors and their construction in order to obtain improved operating qualities and greater efficiency in motor performance; and also to produce improvements in design and construction and assembly of the motors such as will facilitate the manufacture of the units. These objectives will be referred to further hereinafter.

Broadly speaking, it is a further object of the invention to provide designs and constructions of such motors whereby they shall be reversible under control, the direction of rotation being dependent upon and controlled by the manner and sequence in which the pulses are delivered to the windings. Specifically, it is a further feature and object of the present invention to obtain this feature of controlled reversibility in motor constructions of superior operating characteristics and improved efficiency previously referred to herein.

At this point I also mention that this feature of reversibility is produced in the presently disclosed motor constructions in such manner that said motors are also self-starting in either direction of rotation as controlled by the current supply.

The factor of inertia of the rotor element enters vitally into the production of the desired operations of the motor. Likewise, the torque which will be developed between the stator and rotor elements at each pulse is a vital factor in determining the operational characteristics of the motor.

To further reduce the inertia of the rotor, the presently disclosed designs are such that substantially the only magnetic material, such as iron, needed in the rotor itself is the relatively small amount needed for the rotor teeth. The rotor teeth may then be supported by non-magnetic material such as magnesium, of low specific gravity. Also, the designs herein disclosed are such that a comparatively small amount of such low specific gravity material is needed in the design. This will further reduce the rotational inertia of the rotor. Also, the reduction of the amount of such low specific gravity material will result in considerable saving in cost of the unit, notwithstanding the comparatively high cost of such material per unit weight.

According to an important feature of this invention the torque may be increased by providing in each section of the motor two or three, or even more sets of the small axial dimension air-gaps, now "sub-gaps," with intervening sub-poles of the stator, and by providing on the rotor a corresponding number of sets of the small angular embracement and small axial dimension teeth working in said sets of "sub-gaps." The arrangement is such that the excitation of one of the stator coils produces flux flow between the sets of main stator poles and across such sub-gaps and sub-poles of the stator so that all of the sets of small rotor teeth of such section are simultaneously acted upon magnetically. This arrangement is provided in each section of the motor whether there be two, or three, or more than three such motor sections.

According to an important feature of the present invention I subdivide the gap between the poles of each stator polar element into a plurality of sub-gaps, with the intervening stationary flux transmitting sub-poles which are axially aligned with the true poles of such stator polar element. Thus the actual gap between the true polar elements of such stator element is subdivided into a plurality of sub-gaps with intervening stationary blocks of magnetic material separating such sub-gaps. I then provide the rotor with a polar element corresponding to such stator polar element, such rotor polar element including blocks of magnetic material of size and axial location to move into and through the sub-gaps of the stator polar element, there being as many of these rotor blocks as there are sub-gaps in the stator polar element. When such rotor blocks enter into the sub-gaps the path of flux between the true poles of the stator element includes such blocks of the rotor element, and narrow or thin air gaps between such rotor blocks and the true poles of the stator element as well as narrow or thin air gaps between the rotor blocks and the stationary flux transmitting elements which are included in the stator element itself. Thus, the flux developed between the true stator poles is caused to act on all of the plurality of rotor blocks, each line of force thus performing multiple duty in the development of torque on the rotor.

Thus the torque producing effect will be multiplied in direct proportion to the number of such rotor blocks so provided between each pair of stator poles. It is important to point out that such multiplication of torque developed by the rotor is secured without increase in the number of flux lines flowing between the true poles of the stator element, disregarding any possible increase in leakage due to the increase in length of the magnetic path. It is, however, important to note that such increase in torque does not require increase in either the flux density or the cross-sectional area of the flux transmitting media, so that such increased torque is obtained without impairment of the other magnetic qualities to which I have previously made reference in this case.

By the foregoing expedient of multiplying the number of rotor polar blocks which are acted on by each line of force, it is possible to design and build the motors with very narrow poles (measured in the direction of rotation), so that small angular movements will be produced by the successive current pulses, without sacrifice of torque developing ability, for the reasons already explained.

The disclosures hereinafter detailed include designs and constructions embodying the foregoing features, which designs include two structurally defined forms.

In order to obtain the best operation some provision should be made to ensure that the pulses shall be maintained just long enough, for the intended rate of pulsing, and for the loads being carried or overcome, to ensure that each rotor stepping movement shall conclude at the intended stopping point, so that the other rotor poles will then stand at the correct positions with respect to their then co-operating stator poles, to ensure correct successive stepping operation. I shall disclose the means to enable securing the foregoing desired function and result.

It may first be stated that the vibrational effect above described may, in some cases, be reduced or even completely avoided in the following manner: by connecting an adjustable friction coupling to the rotor, which coupling is of design and frictional characteristics to permit rotor advancement under the load imposed by the friction of such coupling, the energy of advancement of the rotor may be dissipated by the coupling for control of rotor operation. By adjustment of the amount of the frictional resistance offered by such coupling the vibratory action of the rotor may be "critically damped," so that the vibratory movement may be completely eliminated. Such an arrangement will serve to improve the motor operation when the motor is used as a counter— that is, in operations in which the rotor is to advance definitely one step for each electrical pulse delivered to the stator coils.

I may also make provision for improving the performance and accuracy and dependability of operation of motors of the type herein disclosed by use of capacitors shunted across the stator coils in proper manner and of proper impedance.

These will be described hereinafter.

Motors embodying the features herein disclosed are admirably adapted to uses requiring high starting torques, for the following reasons, among others:

When using a three coil stator arrangement (or more than three coils) each angular advancement of the rotor for a cycle of imposed current is very small, when the number of poles used is large. Actually, under the assumed design conditions just stated, each angular advance per cycle for three phase operation is the width of six steps of rotor movement, the angular advance per cycle being six steps. When using a design incorporating a large number of poles, such as 360 poles, it is evident that when supplied with 60 cycle current the synchronous speed would be one revolution per second or sixty R. P. M. When a high inertia load such as a hoist, or a table carrying substantial load and vertically movable, or a planting machine or a miller is to be operated, such load may be directly connected to the motor embodying the present features, through a simple flexible coupling which coupling is of design to permit a slight angular displacement of one element with respect to another element. Upon imposing the current supply to the motor, such coupling will yield sufficiently to take care of one or two cycles of A. C. prior to bringing the load into motion, thus eliminating the need of making special provisions for bringing such loads into movement. If, during such a starting operation as just described the motor should be drawn out of synchronism, such flexible coupling will yield slightly, permitting a vibratory action of the rotor to occur, and the rotor will again come into step when the cycle has been completed. Thus a starting impetus may be given to the load, enabling such load to be brought to speed within a few cycles of operation.

The foregoing states various of the features of construction herein disclosed, and the objectives to be attained by their use, among others.

I shall disclose the means which I have provided for attaining these objectives and the structures herein illustrated embodying such means.

Other objects and uses of the invention will appear from a detailed description of the same, which consists in the features of construction and combinations of parts hereinafter described and claimed.

In the drawings:

Figure 1 shows a perspective view of one form of motor embodying various of the features of invention, this figure being in partial section;

Figure 2 shows a longitudinal section corresponding to Figure 1, but in blasted form;

Figure 3 shows a face view of a modified form of rotor polar element;

Figure 4 shows a manually or self-driven operable commutator unit for connection to the stator coils of a motor embodying features of my present invention;

Figure 5 shows schematically the three coils of a typical three coil stator element of a motor embodying features of my present invention, and with said coils connected together in delta connection, for supply of three phase A. C. to said coils when the motor is to be operated by such a current supply;

Figure 7:
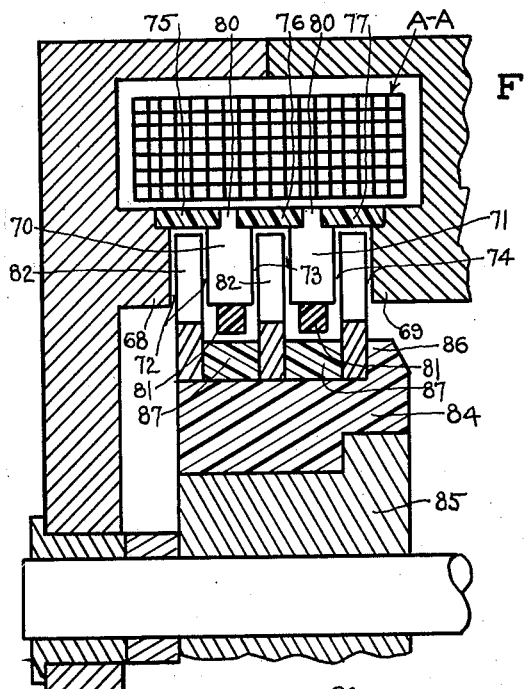
Figure 8:
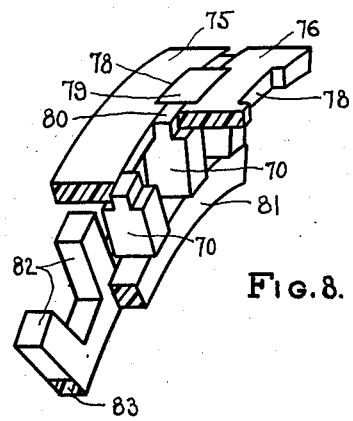
Figure 9:
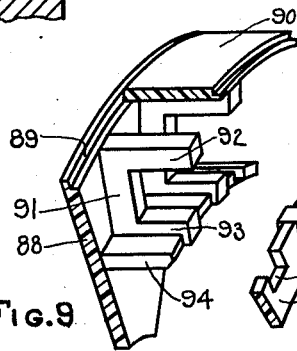
Figures 10, 11:
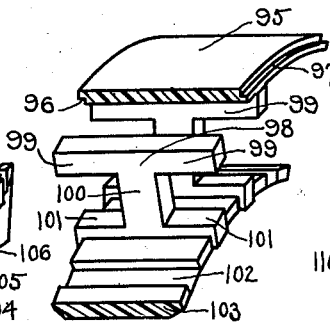
Figure 12:
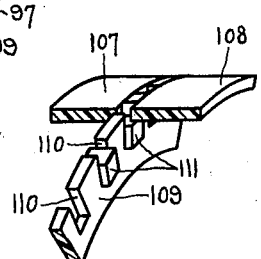
Figures 13, 14:
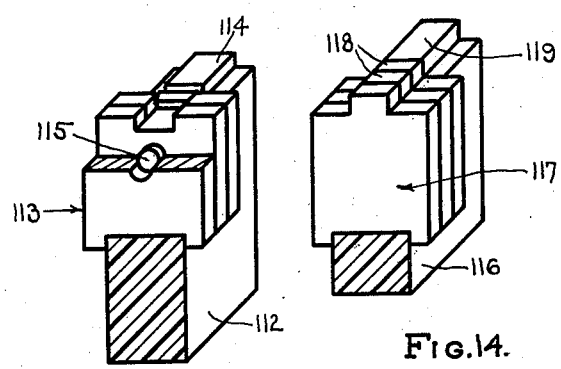
Figure 15:
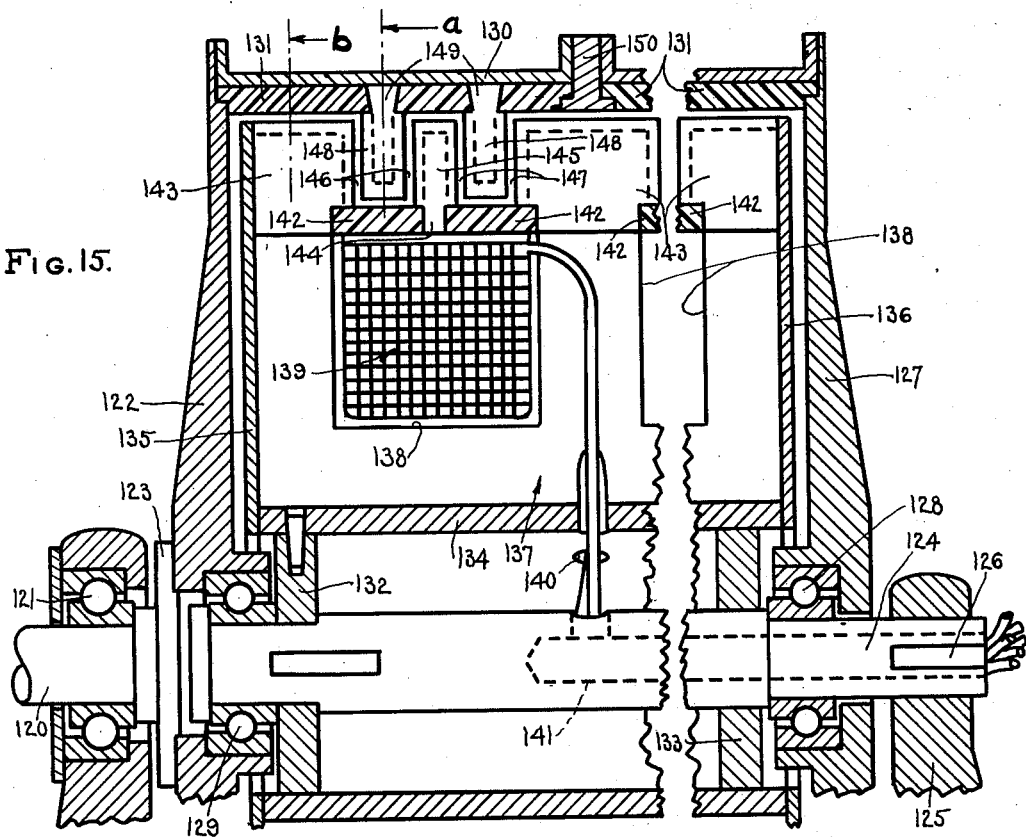
Figure 16:
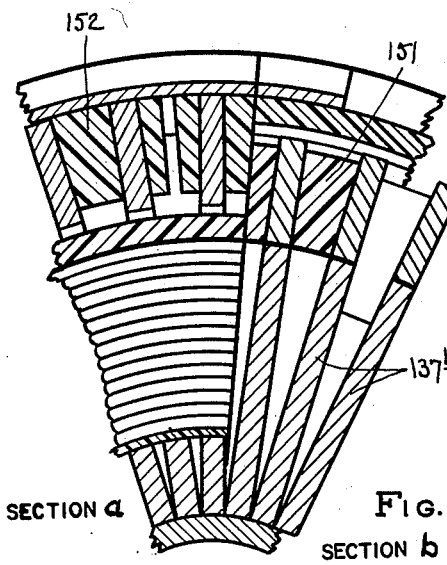
Figure 17:
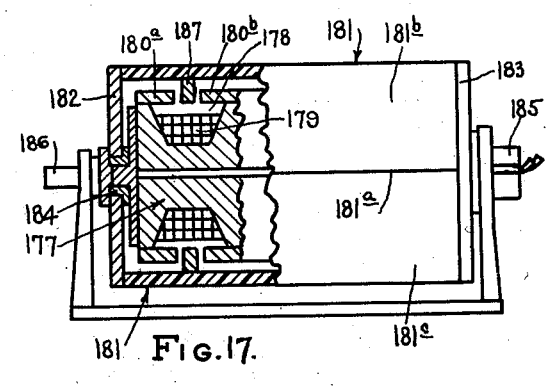
Figure 18:
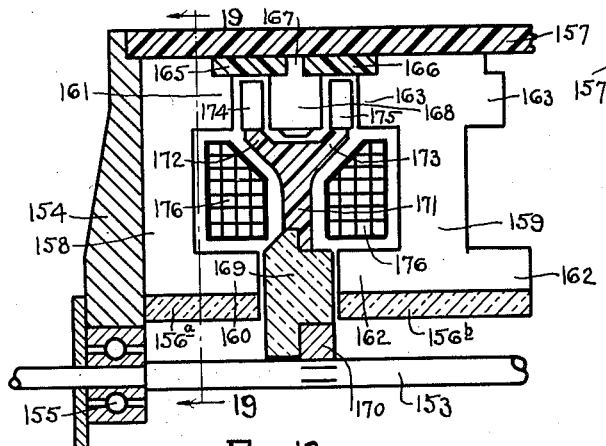
Figure 19:
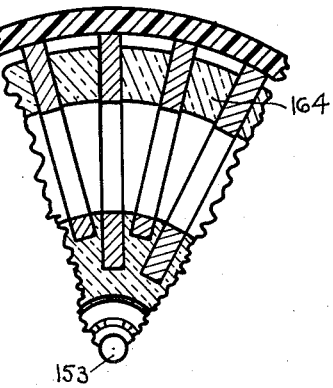
Figure 20:
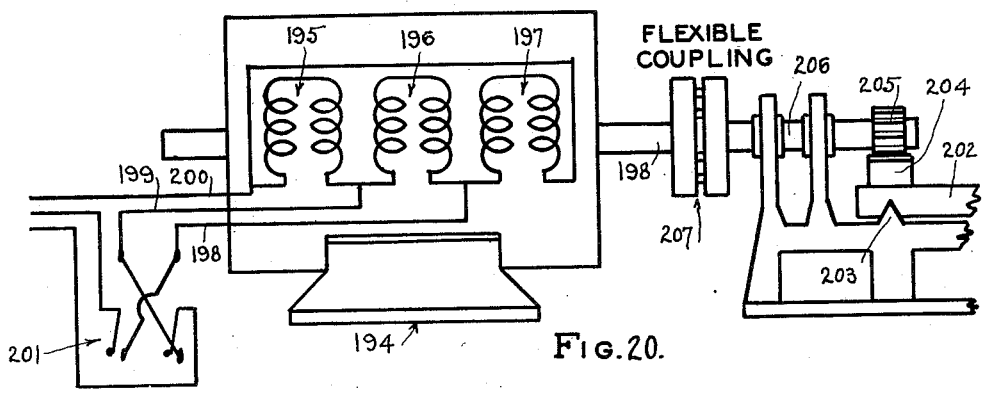
Figure 21:
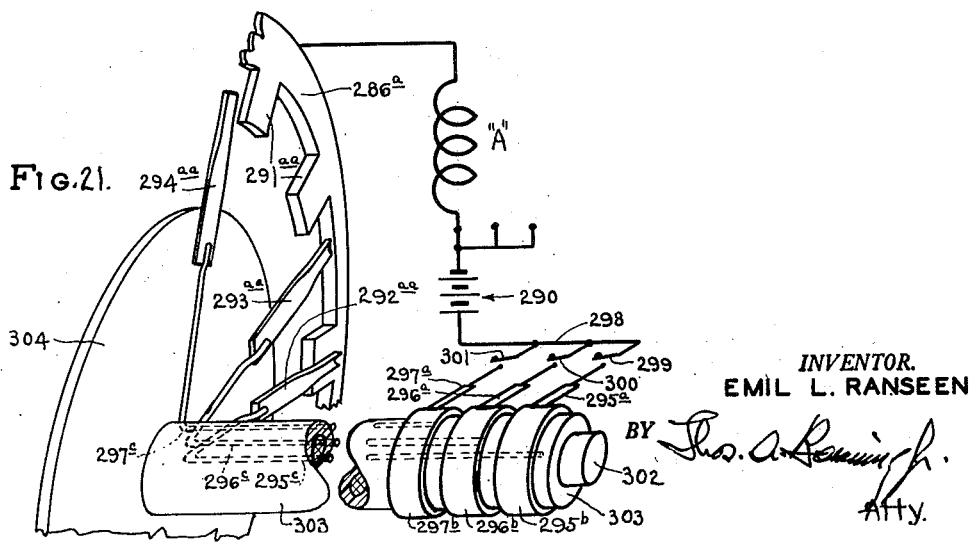
Figure 22:
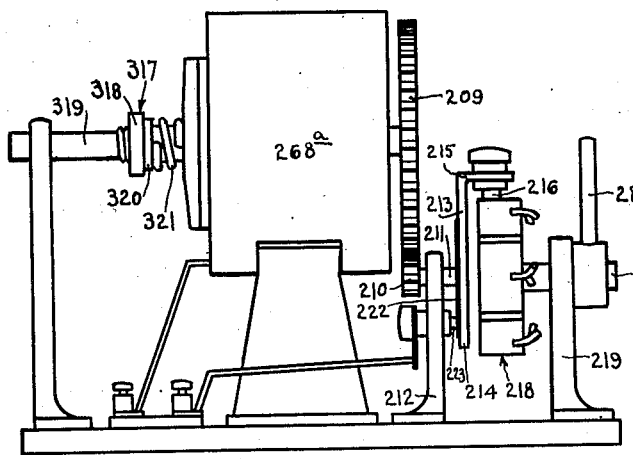
Figure 23:
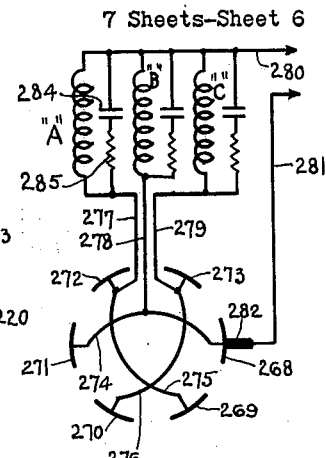
Figures 24, 25:
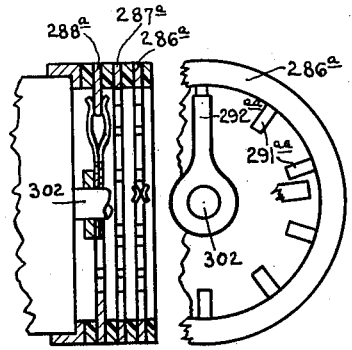
Figure 26:
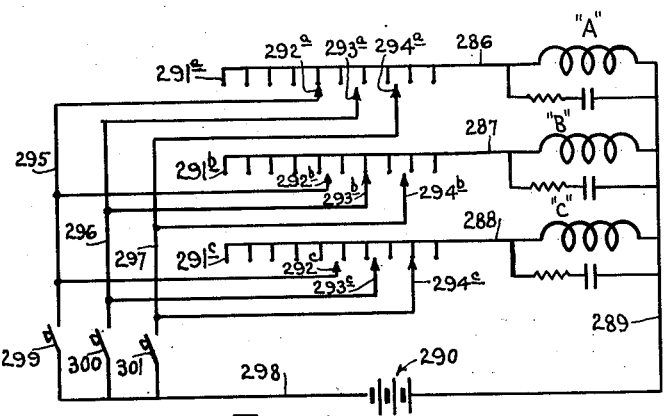
Figure 27:
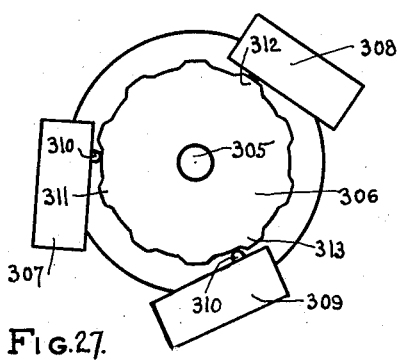
Figure 28:
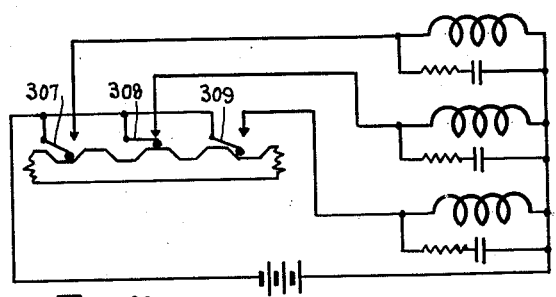
Figure 29:
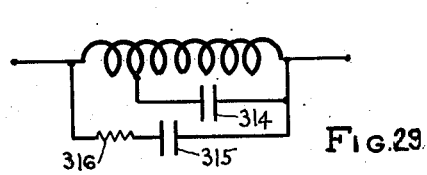
Figure 30:
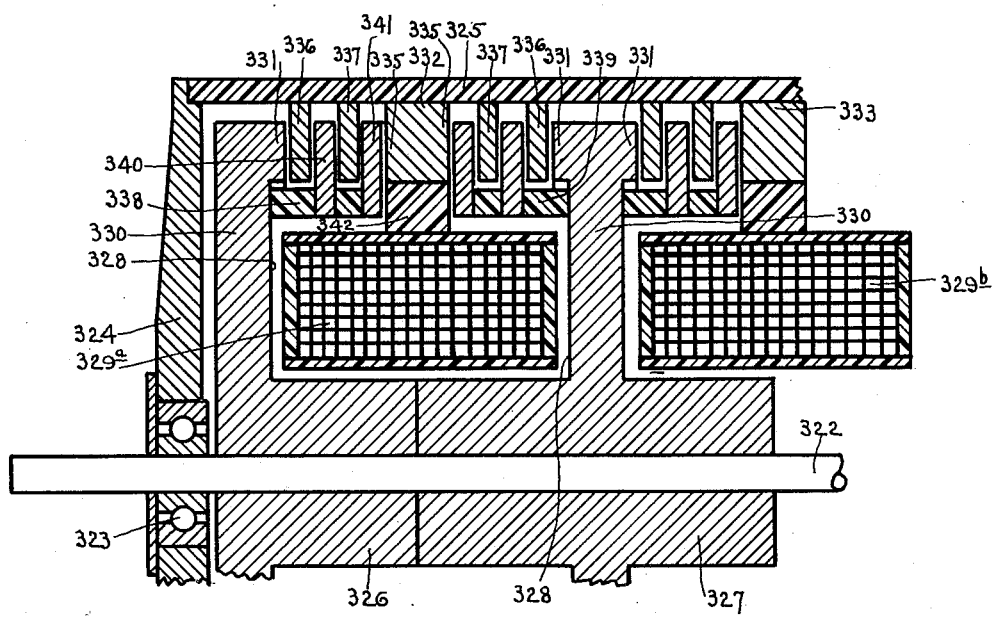
Figure 31:
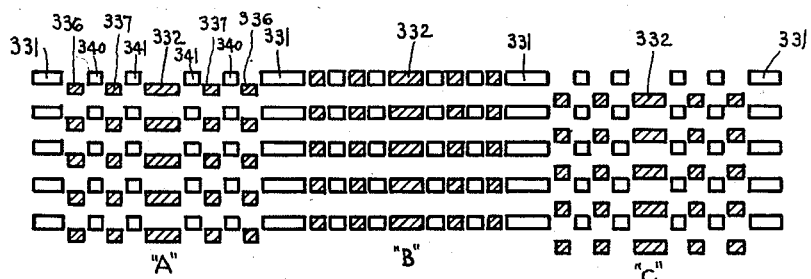

Figure 6 shows schematically a modified arrangement of stator coils of a motor embodying features of my present invention, in which modification I have sub-divided each stator coil into two sections, and have centrally tapped each such section, all such coil elements being ring or delta connected together; together with a commutator suitable for combination with such a sectionalized coil arrangement;

Figure 7 shows a fragmentary longitudinal section through slightly more than one-half of one end of a modified form of motor in which the polar gap of each stator polar element is sub-divided into three rotor teeth providing annularly extending spaces lying in planes normal to the axis of rotation, with flux transmitting blocks of magnetic material between said annular spaces, each rotor polar element being provided with a set of teeth in each such plane; and in this construction I have, for convenience, also shown an arrangement in which the stator windings are located outside of the rotor element, with inwardly extending stator polar elements and outwardly extending rotor elements;

Figure 8 shows a fragmentary perspective view of a portion of the stator element showing how the blocks which subdivide the gap between the true poles of the stator may be conveniently supported;

Figure 9 shows a fragmentary perspective view of a portion of the stator element showing how laminations of said stator element may be conveniently supported in a suitable structure to establish a portion of the true polar element;

Figure 10 shows a fragmentary perspective view of a portion of the rotor element showing how laminations may be supported in the periphery of a rotor plate;

Figure 11 shows a fragmentary perspective view of a portion of the stator element showing how laminations of said stator element may be conveniently supported in a suitable structure to establish the stator formation between two of the coils, and this figure may be considered as being complementary to the showing of Figure 9;

Figure 12 shows a fragmentary perspective view of a modification of the embodiment shown in Figure 2;

Figure 13 shows a fragmentary perspective view of a modification of the embodiment shown in Figure 7, such modification consisting in the provision of a laminated structure for the rotor teeth;

Figure 14 shows a fragmentary perspective view of a modification of the embodiment shown in Figure 7, such modification consisting in the provision of a laminated structure and the sub-division of the gap between the true poles into a plurality of sub-gaps;

Figure 15 shows a longitudinal vertical section through slightly more than one-half diameter of another modified embodiment of the present invention, such modification consisting in the location of the interacting stator and rotor polar elements at the outer periphery of the structure at locations of maximum radius;

Figure 16 shows a fragmentary transverse section through the modification shown in Figure 15, and Figure 16 is a double section taken partly on the line "a" of Figure 15, and partly on the line "b" of Figure 15;

Figure 17 shows a longitudinal view partly in section of still another modified embodiment of features of my present invention, in which modification the stator is located within the rotor as in the modification shown in Figure 15;

Figure 18 shows a fragmentary half-section (longitudinal) through another modified embodiment of the invention, this embodiment being in effect a "hybrid" between the embodiments shown in Figures 7 and 15;

Figure 19 shows a fragmentary cross-section taken on the line 19—19 of Figure 18, looking in the direction of the arrows;

Figure 20 is a schematic showing of a motor embodying features of the present invention with its shaft coupled to a high inertia load, such as the table of a machine tool, such coupling being effected through the medium of a flexible coupling of construction such as to allow for a small angular displacement of the driving end without corresponding displacement of the driven end against spring yield or the like;

Figure 21 shows more or less schematically, and in perspective, some of the commutating elements by which a motor may be controlled for various conditions of operation; and the elements shown in this figure will be better understood by reference to Figure 26 which is a schematic wiring diagram to be read in connection with Figure 21;

Figure 22 shows, more or less schematically, a motor embodying features of the present invention, and provided with a commutator arrangement for control of current delivery to the several stator coils in proper sequence; and this figure also shows a frictional brake interposed between the rotor and the driven load;

Figure 23 shows schematically a simple circuit arrangement for use in connection with the motor arrangement of Figure 22, including the commutation elements thereof;

Figure 24 shows a longitudinal fragmentary section through the commutator end of a motor embodying the features of the present invention, this figure showing the commutation arrangements for one of the three stator coils;

Figure 25 shows an end view corresponding to Figure 24;

Figure 26 shows a schematic wiring diagram of the stator coils, the commutation elements, and the switching gear of the arrangement shown in fragmentary form in Figure 21;

Figure 27 shows a portion of the commutation elements for a three stator coil motor, in which commutation elements use is made of a rotor shaft driven cam element and co-operating switches such as micro-switches;

Figure 28 shows a schematic wiring diagram including the commutation elements shown in Figure 27;

Figure 29 shows schematically a single stator coil and capacitors (and a resistor) connected across such coil, being a modified arrangement as compared to other coil arrangements also illustrtaed herein, such modifications enabling operation with a smaller loss of energy than will occur with previously illustrated arrangements;

Figure 30 shows a fragmentary longitudinal section through slightly more than one-half of the length and one-half of the diameter of another modified construction of motor embodying features of the present invention; this embodiment comprising what may be called a second form of "hybrid" construction; and Figure 31 shows, more or less schematically, the relative positions of stator poles and rotor teeth (for one position or step of the rotor), this figure showing said parts for all three sections of the motor so that the successive positions of the poles and teeth may be readily understood for a complete cycle of steps.

Referring first to Figures 1 and 2 I have therein shown a typical motor construction embodying certain of the features of novelty herein disclosed. The motor shown in these two figures, and elsewhere, includes three stator elements and corresponding rotor elements, and is so devised that rotor rotation may be produced in either direction. This construction includes an energizing coil for each stator element, and the teeth of the several stator and rotor elements are so related and positioned that by energizing the stator coils in succession the steps of rotor advancement will be sequential, three steps comprising a group, and each stator coil being energized at its proper sequential position in such group. By energizing the three stator coils in either sequence, such as "A," "B," and "C" or "A," "C," and "B," the direction of rotation can be determined. Various other features and functions will appear as the motor construction is detailed.

The motor construction of Figures 1 and 2 includes the stator element generally designated as 30, the shaft 31, and the rotor element, generally designated as 32. This rotor element includes three sections 32$^a$, 32$^b$, and 32$^c$ which are spaced along the shaft equidistant from each other. For convenience of construction these rotor elements or sections are of built up form, the details of which will be presently described. The stator element is also sectionalized into the four sections, 30$^a$, 30$^b$, 30$^c$, and 30$^d$. The end sections 30$^a$ and 30$^d$ support suitable bearings 33 and 34, preferably of an anti-friction type, such as ball bearings as shown, thereby centering the shaft and the rotor with respect to the stator.

The stator sections are provided with the oppositely facing annular grooves 35, 36, 37, 38, 39 and 40, so that when the stator sections are drawn together the proximate pairs of grooves come together, thus providing annular chambers, three in number, to accommodate the three stator coils. These grooves are so formed that when the successive stator sections are drawn together the annular chambers register with the several rotor sections, each annular chamber having its central plane which is normal to the axis of rotation including the rotor section corresponding to such chamber. In Figure 2 the various stator and rotor elements have been separated axially into positions illustrating a scheme of assembly of the parts, but in Figure 1 the assemlbed relationship of the stator and rotor parts is well shown.

The stator coils A, B, and C are set into the several annular chambers established as above explained, during the assembling operations. The stator sections are so formed as to provide the circular flange portions 41, 42, 43, 44, 45 and 46 which are all of the same radius measured from the axis of rotation and which flange portions lie at opposite sides or faces of the peripheral portions of the rotor sections when the assembling operations have been completed. These flange portions are provided with teeth whose form and functions will be presently explained in detail. The stator sections are also so formed as to provide the circular flange portions 47, 48, 49, 50, 51 and 52 which are all of the same radius measured from the axis of rotation, being of sufficiently large radius to encompass the stator coils when the assembly operation is completed. These flange portions 47 to 52, inclusive are also of greater axial dimension than the flange portions 41 to 46, inclusive, as well shown in Figure 1. Accordingly, when the parts have been assembled the flange portions 47—48, 49—50, and 51—52, come together in pairs, thus completing the outer cylindrical enclosures of the annular chambers within which the several coils are accommodated. But when such assembling operation has been completed the flange portions 41—42, 43—44, and 45—46 do not come into contact but the disk like spaces are left between these pairs of flanges to accommodate the peripheral edge portions of the rotor elements, as already stated. Conveniently, the dowel pins 53 are set into the proximate surfaces of the stator sections to ensure good alignment; and suitable means, such as through bolts 54 may be extended axially through the several stator sections to draw and hold them securely together.

The stator elements 30$^a$, 30$^b$, 30$^c$, and 30$^d$ are formed of magnetic material so that as each of the coils is energized an encircling field is produced with its lines of force flowing across the air-gap between the corresponding flanged portions 41—42, or 43—44, or 45—46, as the case may be. These flanged portions are toothed as already mentioned, and these teeth cooperate with teeth of the corresponding rotor element as will presently appear.

Each rotor element includes a circular or annular section, 55, 56, or 57, which rotates between the corresponding stator flanges. These sections 55, 56, and 57 are formed of magnetic material, and are also toothed to cooperate with the corresponding stator teeth. Conveniently these magnetic sections 55, 56, and 57 are carried by plates or flanges 58, 59, and 60, secured to the shaft in driving fashion. In the form shown in Figures 1 and 2 the rings or sections 55, 56, and 57, are thus made separate from these plates 58, 59, and 60, for convenience of assembly, and also, in some cases, to reduce the amount of magnetic material needed for the motor, since the plates 58, 59, and 60 need not be formed of magnetic material, as they do not carry any flux. As shown in Figures 1 and 2 the edge portions of the plates may be shouldered as at 61, the sections 55, 56, and 57 seating nicely on such shoulders and the rings being secured in place by screws or the like, as shown in Figure 1 at 62.

It is now noted that since the toothed rings 55, 56, and 57 of the rotor extend radially farther out than the internal diameters of the flanges 41 to 46, inclusive, special arrangement must be provided to enable assembly of the parts into their proper operating relationship. One such structural arrangement would be the division of the stator elements on a plane extending through the axis, so that the stator would in such case comprise two cup-shaped sections which could then be brought together to enclose the previously completely assembled rotor section. However, the arrangement shown is one in which the several stator and rotor sections may be brought together according to a simple order of assembly progression, the various stator and rotor elements being successively set into place as the operation proceeds. It will be noted that in Figure 2 I have shown the ring element 56 as already assembled to its plate element 59. Thereafter the several stator and rotor elements may be brought successively into place from both ends of the motor according to simple operations which need not be described in detail here. During these assembling operations the bearing elements 33 and 34 will eventually be received and seated within the openings 63 and 64 of the two stator end sections; and finally the race-retainers 65 and 66 will be set against the outer faces of the stator end sections and secured in place thereto. These retainers are provided with holes to pass the shaft 31 as is shown in Figure 2.

The opposing flanges 41—42, 43—44, and 45—46, of the stator element are provided with oppositely disposed teeth, 41ª, 42ª, 43ª, 44ª, 45ª, and 46ª, as well shown in Figure 1, and the teeth of the flanges 41 and 42 are opposite to each other, the teeth of the flanges 43 and 44 are opposite to each other, and the teeth of the flanges 45 and 46 are opposite to each other. Likewise there are the same number of teeth of all of the flanges of the stator. The ring elements 55, 56, and 57 of the rotor are also provided with outwardly extending teeth 55ª, 56ª, and 57ª; and these rotor rings are provided with the same number of teeth as are provided in the several stator flanges. Examination of Figure 1 in particular shows that the spaces between the teeth of each stator element and each rotor element are larger than the angular embracements of the teeth of the rotor elements, and in the form therein shown such spaces between successive teeth of an element are substantially twice as wide as the teeth of such elements. Furthermore, the teeth of each stator section (being the teeth of the flanges 41—42, the teeth of the flanges 43—44, and the teeth of the flanges 45—46), are so positioned, angularly with respect to the rotor section teeth between them that as the rotor rotates a progressive action is produced magnetically on the several rotor sections when the stator coils are properly energized. This will be understood from the following:

Examination of Figure 1 shows that, when the rotor is in the position there shown, the rotor teeth 55ª of the left-hand section are close to the stator teeth 41ª and 42ª of the corresponding stator section, considered as rotor movement in clockwise direction. Also, that in the position of that figure, the rotor teeth 56ª of the middle section are directly in registry with the stator teeth 43ª and 44ª of the corresponding stator section; and, that in the position of that figure, the rotor teeth 57ª of the right-hand section are leaving the stator teeth 45ª and 46ª of the stator section, considered as rotor movement in clockwise direction. Under these relative positions of the rotor and stator teeth of the several sections it is evident that energization of the stator coil A will develop flux between the teeth 41ª and 42ª with corresponding production of magnetic pull on the teeth 55ª of the rotor, thus drawing the rotor in clockwise direction to bring the teeth 55ª into registry with the teeth 41ª and 42ª. It is assumed that during the interval of energization of the coil A the coils B and C are non-energized. Having thus drawn the rotor into its new position it will remain locked magnetically in such position as long as the coil A remains energized. Also, during this movement of the rotor, the rotor teeth 56ª have moved clockwise away from the corresponding stator teeth 43ª and 44ª, and also the rotor teeth 57ª have approached the corresponding stator teeth clockwise, 45ª and 46ª, leaving the stator teeth to which they were previously in close position, behind them. By this operation, however, said rotor teeth 57ª have been brought into position close to those stator teeth 45ª and 46ª which are next in order measured in the clockwise direction of movement.

If next the coil C be energized, the coil A being now de-energized, and the coil B non-energized, it will be seen that a pull will be exerted on the rotor teeth 57ª of the section C, thus producing a further rotor advancement in the clockwise direction. At the same time the rotor teeth 56ª of the section B will be brought close to the corresponding stator teeth 43ª and 44ª so that by de-energizing the coil C and now energizing the coil B a further rotor advancement will be produced, also in the clockwise direction. This further rotor advancement will bring the teeth 55ª of the section A close to the stator teeth 41ª and 42ª measured in the clockwise direction so that the elements are now ready for a repetition of the cycle. Thus, by the progressive energization of the coils in the order A, C, B, A, C, B, etc., a clockwise rotation of the rotor will be produced, step-by-step or as a continuous operation, as will presently appear.

If, instead of the coil energization according to the sequence A, C, B, A, C, B, etc., the cycle had been A, B, C, A, B, C, the rotor rotation would be found to be counter-clockwise, namely, in reverse order from that just described. Thus the direction of rotation may be dictated merely by changing the sequence of coil energization, corresponding, somewhat, to the reversal of a polyphase A. C. motor.

The foregoing functions are dependent on the relative sequential registry of the sets of rotor teeth with the corresponding sets of stator teeth of the several motor sections. In the arrangement shown in Figure 1 it will be noted that all of the stator section teeth are located in alignment axially with each other. This fact is apparent from examination of that portion of the cut-away stator near the lower side of Figure 1. Accordingly, the sequential registry of the rotor teeth with corresponding stator teeth is, in this form, effected by setting the rotor rings 55, 56, and 57 at successive positions such as to secure the desired sequential registry with stator teeth. It will be apparent that instead of thus effecting the desired sequential registry by setting the rotor section teeth at successively advanced positions angularly, the result might have been secured by setting the stator sections with their teeth at successively advanced positions, the rotor teeth being in axial alignment with each other. Or, combinations of these two possible arrangements might be used if desired.

Various arrangements may be used for delivering the currents to the stator coils in proper progression. Some of these will be disclosed and described hereinafter.

In Figure 3 I have shown a section of one of the rotor rings 55, 56 or 57, such section being numbered 67. If desired the rotor rings may be built up from such ring sections attached to the plates 58, 59, and 60, for enabling the parts to be assembled by operations other than previously suggested herein.

Examination of Figure 1, and especially the left-hand rotor element thereof, will show that when the coil A is energized the flux developed across the space between the opposing teeth 41ª and 42ª must bend or deflect towards the observer to find its path through the rotor teeth. The pull then exerted upon said teeth is due to the tendency for such flux to shorten its path in order to reduce the reluctance of that path. The total pull thus exerted on each tooth is thus due to the flux entering the rotor tooth at one side, and leaving such rotor tooth at the other side. The distribution of the flux thus flowing to and from the rotor tooth will depend on many factors and variables, but it is well known that the length of the path and the density of the flux at any given portion of such path both exert strong influences on the distribution. When the teeth are comparatively wide (measured in the direction of rotor rotation), as shown in Figure 1, it is evident that a large portion of the flux must travel through a comparatively long path, having to flow angularly a considerable distance to meet the tooth at one face, then through such tooth, and finally having to flow angularly a considerable distance to return to the stator pole tooth opposite to that from which such flux was derived. The portion of flux which thus takes a long distance of path will depend largely on the density to which the material of the shorter path portions is saturated; as the saturation is increased the leakage of flux to longer paths will be increased. Evidently, therefore, the use of small teeth (that is, teeth of small arcuate embracement) is desirable since the flux flowing through each such tooth will be of a more uniform density or saturation, and since substantially the entire tooth may be used to a high degree of saturation for a large part of the tooth movement into its position of complete registry with the corresponding stator teeth.

In the structure shown in Figures 1 and 2 there is provided a single set of rotor teeth between each pair of stator teeth, so that the flux flowing between each pair of stator teeth acts only on such single set of rotor teeth. Thus the pull exerted on the rotor due to such flux is that pull developed by action of that flux on such single set of rotor teeth. When the rotor teeth are of small width (measured angularly around the shaft), and consequently carry a smaller amount of flux than could be carried by larger teeth, it is evident that the torque which may be developed by each of such small width teeth is correspondingly limited. This is a necessary result of the provision of a large number of teeth around the structure, with correspondingly small angular advancement of the rotor during each current impulse step.

Referring now to Figure 7 I have therein shown a modified construction in which the flux passing between each pair of stator teeth traverses two or more rotor teeth in a series arrangement, that is, from tooth to tooth across the entire travel. To this end I have shown the typical stator teeth 68 and 69, corresponding typically to the two teeth 41ª and 42ª of Figure 1, for example. The clearance between these teeth 68 and 69 is preferably greater than that between the corresponding teeth 41ª and 42ª of Figure 1, for example. This greater clearance is then subdivided into two or more sub-gaps 72, 73 and 74 by the provision of intermediate teeth 70 and 71 of magnetic material. Conveniently these intermediate teeth are carried by encircling rings 75, 76 and 77 of non-magnetic material. Reference to Figure 8 shows that these rings 75, 76 and 77 are notched in their edges as shown at 78, and the spacers 79 are seated in said notches to thus space the rings 75, 76 and 77 accurately around the stator. The intermediate teeth 70 and 71 are provided with lugs 80 on their outer ends, which lugs are then set into the spaces between the proximate edges of the rings 75, 76 and 77 and the successive spacers 79, the sizes of the parts being such that when the stator sections are drawn tightly together the intermediate teeth are very securely held in place. Preferably a ring 81 is located just within the teeth 70 or 71 as the case may be of each set of the intermediate teeth so as to provide further stability to the intermediate teeth, such rings 81 being formed of non-magnetic material.

The rotor provided in the arrangement shown in Figures 7 and 8 carries teeth 82 in sets corresponding to the sub-gaps of the stator, just described. These teeth 82 are formed of magnetic material, comprising extensions from the rings 83. In the detailed design shown in Figures 7 and 8 these rings are set onto a sleeve 84 of non-magnetic material which is in turn carried by the hub element 85 mounted on the shaft 31ª. A flange 86 is provided on one end of the sleeve 84, and spacer rings 87 are set between the successive rings 83, so that the assembled structure includes the teeth accurately spaced to move through the sub-gaps 72, 73 and 74 as will be readily apparent from Figure 7.

It will be understood that Figure 7 shows only one section of the stator and rotor construction to which I have just directed my description, corresponding to the section A of Figure 1, and that similar structural sections correspondings to the sections B and C of Figure 1 will be provided to the right of the section illustrated in Figure 7 to provide the complete three section unit. The stator coils necessary for such sections will also be provided therefor, one of such coils being shown at A—A in Figure 7.

With the arrangement thus disclosed in Figures 7 and 8 it is apparent that the flux flowing between one of the teeth 68 and the corresponding tooth 69 must traverse all of the sub-gaps (being three in number in the illustrated construction), and that such flux, as it flows across such subgaps must also flow through the rotor teeth moving through such sub-gaps. It is thus apparent that such flux is thus enabled to exert force on all three of the so-traversed teeth, thus developing a pull equal to the combined pull developed on all three of such teeth. It is of course understood that all three of the teeth of each rotor set are located in axial alignment so that the foregoing results is attained.

By thus multiplying the pull developed by the flux flowing between a pair of the stator teeth, it will be seen that the number of stator and rotor sets of teeth provided around the unit in each section, A, B, or C, may be greatly increased, with corresponding reduction of the angular displacement effected during each excitation of a stator coil, and without reduction of the torque which may be developed by the motor. This is true, since the reduction in size of each tooth acted on at a given instant is compensated by the multiplication of the number of teeth so acted on at each instant. In fact, it is actually possible to thus effect a material increase in the torque developed by the rotor, while at the same time making it possible to actually materially reduce the angular advance of the rotor which is executed corresponding to each excitation of a stator coil. By this means it is possible, for example, to provide a stator and rotor arrangement in which as many as 120 steps of the rotor, or more, are executed during each revolution.

Figures 9 to 14, inclusive show various details of structure in which elements of the magnetic circuit are formed of laminated construction. In these figures, Figures 9 and 11 show portions of a typical stator element in which the magnetic sections are of laminated construction. These two figures compliment each other in the sense that they show adjacent stator portions. In this case the portion shown in Figure 9 includes the end plate element 88 having its outer peripheral edge shouldered as shown at 89 to receive one end of a cylindrical element 90. The U-shaped tooth elements 91 are set against the proximate inner surfaces of these elements 88 and 90, the upper and lower legs 92 and 93 of these U-shaped elements being of different axial lengths as shown. The said upper legs 92 comprise portions of the magnetic circuit corresponding to the outer or cylindrical portion of such magnetic circuit shown in Figure 7, and are of greater axial dimension than the legs 93. Said legs 93 comprise the stator teeth, and correspond to the teeth 68 shown in Figure 7. Spacers 94 are set between the legs 93 and against the inner face of the end plate 88, thus providing rigidity to the said legs 93. These U-shaped elements 91 are formed of laminations set face to face in well understood manner.

The stator portion shown in Figure 11 includes the cylindrical element 95 having its left-hand edge suitably shouldered as shown at 96 to lock with the shouldered edge of the element 90. The right-hand edge 97 of this element 95 is also shouldered to lock to a correspondingly shouldered proximate edge of the next right-hand element (not illustrated). Thus the outer shell of the motor element is sectionally produced. A series of H-shaped tooth elements 98 is provided for the element 95. These elements 98 are set against the inside surface of the element 95 and secured thereto in suitable manner (not shown). Each of these H-shaped elements includes the upper or outer leg portion 99, with leg projections to each side of the radial central portion 100; and is provided with the inner leg portion 101, with tooth projections to each side of the radial central portion 100. The said leg projections 99 are of length to meet and engage with the corresponding leg portions 92 (of the end section shown in Figure 9), and/or 99 (of a proximate section of the form shown in Figure 11). Thus the magnetic continuity is produced at the outer or peripheral portion of the structure. The said projections 101 are of length to leave the necessary air-gaps between said projections and the proximate projections 94 (of the end section shown in Figure 9), and/or 191 (of a proximate section of the form shown in Figure 11). The said legs 101 are conveniently set into grooves 102 formed in the periphery of the non-magnetic carrier or hub element 103, the said legs being locked into such grooves in convenient manner. These H-shaped elements 98 are formed of laminations set face to face in well understood manner.

The rotor section shown in Figure 10 includes the disk element 104 carried by a suitable hub support (not shown), such disk element being provided with peripheral notches 105. These notches are provided at spacing corresponding to the spacing of the teeth of the stator element, as will be readily understood from what has already been described and illustrated herein. The rotor teeth elements 106 are set into and locked to the notches in suitable manner. These teeth elements are formed of laminations set face to face in well understood manner.

When the construction is to be one in which the gaps of the stator element are sub-divided according to the principles described in connection with the showing of Figures 7 and 8, including however the laminated features of Figures 9, 10 and 11, use may be made of such constructions as are shown in Figures 12, 13 and 14. In Figure 12 I have shown the sections of two cylindrical elements 107 and 108 which may correspond to the cylindrical elements 75 and 76, or 76 and 77 of Figure 7. Between the proximate edges of these elements there is received the outer peripheral portion of a circular annulus 109. Both of the elements 107 and 108, and the annulus 109, are formed of non-magnetic material. The outer edge portion of the annulus is notched as shown at 110, and the small tooth elements 111 are set and locked into these notches in suitable manner. These tooth elements project to both faces of the annulus and slightly beyond such faces to provide the intermediate teeth corresponding to the teeth 70 (or 71) of Figures 7 and 8; and to secure proper registry of these intermediate teeth with the teeth 93 and 101 of the corresponding stator elements, the number and spacing of the notches 110 shall correspond to such other stator teeth 93 and 101, as will be readily understood. Each of the tooth elements 111 comprises a group of laminations set face to face and locked into its notch in suitable manner.

Alternatively, the laminated structures of the stator and rotor teeth may be of the forms shown in Figures 13 and 14, respectively, to which I now refer:

In Figure 13 I have shown a fragmentary section of the modified form of rotor. In this case I have shown the ring 112 of suitable material, generally non-magnetic, which is provided with peripheral notches into which are set the rotor teeth units 113. Each of these tooth units is formed of laminations set face to face as shown in the figure. The outer faces of these units 113 are preferably notched to receive an encircling ring 114, preferably of non-magnetic material, which completely encompasses the units of the ring 112, and holds them securely against outthrow under centrifugal action. If desired further restraint against such centrifugal action may be provided by the tension member 115 passed through all of the units which are, for such purpose, provided with suitable openings to receive such tension member.

In Figure 14 I have shown a fragmentary section of the modified form of stator. In this case I have shown the ring 116, corresponding to one of the rings 81 of Figures 7 and 8, formed of suitable material, generally non-magnetic. This ring is provided with peripheral notches into which are set the stator intermediate polar units 117. Each of these polar units is formed of laminations set face to face as shown in the figure. The outer faces of these units are provided with the outwardly extending lugs 118 which register and align with corresponding outwardly extending ribs 119 of the ring member 116, so as to provide a continuous annular rib which then sets into the annular space between the stator rings 75 and 76, or 76 and 77, of the stator, as the case may be.

Thus I have disclosed both solid and laminated constructions of the magnetic circuit elements which are subjected to changes of flux density such as require or make desirable the use of laminated constructions.

In each of the constructions thus far described the stator element, including its exciting coils, is stationary and is located outside of the rotor element, and the rotor element is rotatably mounted within such stator element. With this construction, as thus far disclosed, the stator exciting coils are also located outside of the rotor element, thus requiring coil turns of correspondingly great length in proportion to the overall size and capacity of the unit. Such arrangement will sometimes present objections due to the comparatively high coil resistance thus produced for coils of given magnetic energizing specifications, with correspondingly high $I^2R$ losses, etc. In this arrangement, also, the magnetic circuit of the stator is of corresponding magnitude, requiring a correspondingly large amount of high cost, high specific gravity, magnetic material. It is here noted that the only magnetic material needed in the rotor comprises that comparatively small amount which constitutes the rotor teeth, as will be immediately evident from an examination of the construction of Figures 1 and 2, and those of Figures 7 and 8 (including the modifications shown in Figures 9 to 14, inclusive).

In Figures 15 and 16 I have shown another modified construction in which the stator element, including its exciting coils, is stationary, but is located inside of the rotor element, and the rotor element is rotatably mounted outside of such stator element. This alternative construction is as follows: only one section of the motor being shown:

A rotor shaft 120 is journalled for rotation by the bearing 121 at one side of the unit. The rotor plate 122 is secured to this shaft by the flange 123. A stator supporting rod 124 is set into a suitable support 125 to which such rod is keyed against rotation by the key 126. Another rotor plate 127 is journalled on this stator rod by the journal 128. The end of the stator rod opposite to the support 125 is journalled to the rotor plate by the journal 129. A cylindrical shell 130 of the rotor encloses both the rotor elements and the stator elements, and has its ends secured to the peripheral portions of the rotor plates 122 and 127 as clearly evident from figure 15. Conveniently a cylindrical liner 131 of non-magnetic material is seated within such cylindrical shell and constitutes a supporting medium for the several rotor teeth as will be presently explained.

The stator rod 124 is provided with the two spacer blocks 132 and 133 located close to the bearings 129 and 128, respectively and the inner stator tube 134 is set onto and is supported by these blocks. The end plates 135 and 136 of the stator element are set against and secured to the ends of the stator tube 134, but with clearance from the end plates 122 and 127 of the rotor element. Set onto the tube 134 is the body of magnetic material 137 of the stator. This body is provided with three inwardly extending groove-like recesses 138, (only one full recess, and the end portions of the other two recesses being shown in the cut-away showing of Figure 15). The three stator exciting coils 139 are wound into these recesses (only one of such coils being shown in Figure 15). The terminal connections of these three coils are brought through suitable openings of the structure, 140, inwardly through the space between the stator rod 124 and the stator tube 134, and the stator rod itself is provided with a central endwise extending passage 141 into which such terminal connections are carried, and through which passage such terminal connections are extended to the right-hand end of the stator rod. There said terminal connections for the exciting coils are brought out and connected to suitable control or other elements, as will hereinafter appear.

A pair of ring shaped elements 142 of non-magnetic material is set over each of the recesses 138 after the coil has been wound into such recess. The main stator teeth 143 are set against the stator magnet body 137 at proper locations around the stator, and according to the principles already explained as to spacing, etc. These tooth elements are conveniently undercut as shown in Figure 15, to receive the edges of the ring elements 142, and the teeth are held in place in such locations in convenient manner, the details of which need not be explained.

It is now noted that the rings 142 which surround each of the recesses are of width or axial dimension such as to leave annular spaces between them, or else they are provided with notches in their proximate edges, to receive the inwardly extending lugs 144 of the intermediate stator teeth 145. These intermediate stator teeth are properly aligned with, and are of proper size to cooperate with, the main stator teeth to provide the sub-gaps, according to the principles already explained in detail. Thus the sub-gaps 146 and 147 are provided in the stator structure. The teeth of the stator element, including the intermediate teeth 145, may be locked in place in convenient manner, not described. It is to be noted, however, that these teeth are not subjected to any centrifugal actions, and, aside from very small gravitational forces, they are not subjected to displacing forces other than those due to flux flow, and torque developed with respect to the rotor teeth, presently to be explained.

Secured to the cylindrical liner 131 of the rotor element and extending inwardly from the said liner are the rotor teeth 148. Conveniently these teeth are provided with lugs 149 on their outer ends, which lugs extend through suitable openings of the liner and are conveniently riveted as shown in Figure 15. These rotor teeth conform to the sizes, the spacings, and other requisites already explained herein in considerable detail. If desired the cylindrical liner 131 may be strongly secured to the outer shell of the rotor by the rivets or screws 150, as shown in Figure 15.

Reference to Figure 16, which shows in comparison two fragmentary sections taken on the lines "a" and "b" of Figure 15, shows the presence of the blocks 151 of non-magnetic material located between the stator teeth 143, and the blocks 152 also of non-magnetic material between the teeth 148 of the rotor element.

If desired the detailed construction of the magnetic body of the stator element may be formed of numerous plates or sheets of magnetic material, extended radially outwards from the tube 134 as shown in Figure 16(b), instead of being formed of a block, as hereinbefore described. These sheets, in said Figure 16(b) are designated as 137b. When such a construction is used the blocks of non-magnetic material, 151, will serve to retain the tooth elements 143 of the stator element in proper and desired relationship. Examination of Figure 15 shows that the central portion of the element 137 is divided or separated from the outer cylindrical portion on a cylindrical surface defined by the axially extending line just beyond the outer cylindrical surface of the coil 139. Thus the outer toothed section of said element 137 may be assembled endwise over the inner section of said element, the several tooth portions and the rings 142 being thus successively set into place, the tooth and ring portions of the element 131 being also brought successively into position during such sectional assembling operation.

Although the structure shown in Figures 15 and 16 is one in which the stator coils are located within the body of the structure, thereby making it possible to wind such coils with a greatly reduced length of conductor as compared to the arrangement of Figures 1 and 2, and Figures 7 and 8, still said arrangement of Figures 15 and 16 is one in which the rotor is located outside of the stator and is therefore of correspondingly greater diameter than the arrangements of said Figures 1 and 2, and Figures 7 and 8. The structure of Figures 15 and 16 is therefore one in which the moment of inertia of the rotor is correspondingly large. It may, in some cases, be desirable to provide an arrangement in which the rotor is located within the stator, and at the same time be one in which the stator coils are brought within the diameter of the rotor. Thereby the advantages of reduction of the moment of inertia of the rotor may be combined with the advantages of reduction of the size of the stator exciting coils, with corresponding reduction of the resistances of such coils, reduction of the amount of copper included in them, and reduction of weight of the entire unit. Such a "hybrid" construction is shown in Figures 18 and 19 to which attention is now invited:

In Figures 18 and 19 I have shown the rotor shaft 153 journalled in the end plate 154 of the stator by the bearing 155, only the left-hand end portion of the structure being shown in Figure 18. The tubular element 156 surrounds the shaft, such tubular structure comprising the disconnected sections 156$^a$, 156$^b$ . . . 156$^n$, etc. A stator shell 157, of non-magnetic material, is supported by the peripheral portions of the end plates (only one of which end plates is shown in the figure). The magnetic portion of the stator comprises the elements 158 and 159, the former being an end element and the latter being an intermediate element. It will be understood that there are, in addition to the elements thus illustrated in Figure 18, one additional intermediate element such as 159, and a right-hand end element such as 158, but reversed in its positioning or facing when viewed as in Figure 18, but that such additional elements are not illustrated in said Figure 18. Each of the elements 158 is of U-shape, thus providing the inner and outer arms 160 and 161, respectively; and each of the intermediate elements 159 is of generally H shape, thus providing the inner and outer pairs of axially extending arms 162 and 163, respectively. The elements 158 are supported by the proximate stator end plates and by the cylindrical sections 156$^a$, at the two ends of the stator; and the intermediate elements 159 are supported by the stator shell 157 and by the cylindrical sections 156$^b$ located at corresponding positions along the length of the structure. Since the intermediate cylindrical or tubular sections 156$^b$, etc., are not connected to the end sections 156ᵃ and 156ⁿ it will be evident that all of the intermediate elements 159 find radial positioning and support by the stator shell 157, and that the sections 156ᵇ, etc., serve to retain the inner ends of such elements 159 at proper angular spacing with respect to each other. Reference to Figure 19 shows the presence of the blocks 164 of non-magnetic material set between the outer portions of the elements 158 and 159, thus ensuring correct spacing of said outer portions. This figure also shows that, if desired, the tubular sections 156a, etc., may be provided with slots or grooves receiving the inner end portions of said elements 158 and 159, or that said inner end portions may be moulded into such tubular sections. In either case the elements 158 and 159 are securely connected to the corresponding tubular sections, and thus the parts are held securely in proper relationship.

The proximate arms 161 and 163 of the successive elements provide the teeth of the stator, or, as in the structure shown in Figure 18, they provide the main teeth by which the full air-gaps are defined. It will be understood that when the various parts are assembled together proper tooth relationship is established between the proximate stator teeth according to the principles heretofore explained herein.

In the arrangement shown in Figures 18 and 19 I have shown one set of intermediate teeth within each air-gap thus dividing such air gap into two sub-gaps. To this end I have shown the rings 165 and 166 of non-magnetic material set into the stator shell and against its inner surface at the location of each of the main air gaps. Conveniently the proximate edges of these rings are separated, or are notched, to receive the outwardly extending lugs 167 of the intermediate stator teeth 168, which teeth extend radially inward towards the shaft a distance to transfer the flux flowing between the corresponding main stator teeth. It will be understood that these intermediate teeth are of number, size, and spacing to act as intermediate teeth according to the principles already fully disclosed elsewhere herein. Conveniently the proximate edges of the elements 158 and 159 are recessed slightly at their outer diameter ends to receive the proximate edges of the rings 165 and 166, as well shown in Figure 18.

The shaft 153 carries a disk shaped hub element 169, corresponding to each of the rotor sections. Conveniently each such hub element is directly carried by a ring element 170 set onto and securely locked to the shaft 153, as by a drive fit, or otherwise. The hub element carries the disk shaped element 171 whose outer peripheral portion is bifurcated into a Y-form or section, as shown in Figure 18, thus providing the two axially displaced outwardly extending flanges 172 and 173. These reach to locations close to the inner or small radius ends of the sub-gaps, but with clearance from the inwardly extending intermediate teeth 168. The rotor teeth 174 and 175 are then connected to and project radially outwardly from these flanges 172 and 173, respectively. It will be understood that the number, size and spacing of these rotor teeth corresponds to the principles hereinbefore disclosed.

In Figure 18 the hub element 169 is seen to extend between the inner and proximate arms 160 and 162, thus breaking the continuity of the iron portion of the magnetic circuit. When said hub portions 169 are formed of non-magnetic material, as indicated in Figure 18, it is desirable that said hub element be made comparatively thin so that the break in the continuity of the iron portion of the magnetic circuit shall be as small as is consistent with good practice, taking into account the needs of running clearances between parts. If desired, said hub elements 169 may be made of magnetic material, thus reducing the reluctance of the magnetic path; but attention is called to the fact that when the rotor is running the hub is subjected to the effects of cross-magnetism flowing through its thickness, with consequent development of E. M. F.'s tending to produce eddy currents.

Accordingly, in designing the motor the nature of the work to be performed by the motor should be taken into account in determining whether said hub elements should be formed of magnetic or non-magnetic material. Evidently, when the motor is operated at comparatively slow speed, any eddy current effects will be small, and by reduction of the reluctance of the magnetic path higher torque conditions may be developed with a given current consumption than are possible when non-magnetic material is used for these hub portions.

The exciting coils are located within the spaces non-occupied by the elements 158 and 159, one such coil, 176, being shown in Figure 18, at each side of the corresponding element 171. These coils encircle the motor shaft, so they generate M. M. F.'s in direction parallel to the shaft. Thus the desired flux flows through the magnetic circuits are produced.

In Figure 17 I have shown still another modified embodiment of the present invention in which the stator element, together with its exciting coils is located within the body of the rotor element, thus obtaining the benefit of comparatively small volume of the exciting coils, and reduced resistance, the rotor element, however, being of larger diameter and surrounding such stator element. In this case the stator element comprises the body 177 of magnetic material, provided with the encircling grooves such as 178 (only one such groove being shown in the figure instead of the three required for a three coil operation), the coil 179 being wound into such groove. Surrounding this body 177 are the cylindrical elements 180 of magnetic material, the proximate edges of these cylindrical elements providing or being formed with the teeth of the stator, and such teeth facing each other in pairs, according to the principles already disclosed herein. It will be understood that such pairs of teeth are thus provided for each of the three stator elements, or sections.

The rotor element comprises the cylindrical body 181 having its ends carried by the end plates or flanges 182 and 183. These are, in turn journalled on suitable elements of the stator or otherwise, as shown at 184, for example; and conveniently the stator element is provided with a rightwardly extending stem 185 which is stationary, and the rotor element is provided with the leftwardly extending shaft element 186 which is suitably journalled with respect to the proximate portion of the stator element, as schematically shown in Figure 17. For purposes of assembly the shell 181 is split on the plane 181ᵃ into the semi-cylindrical sections 181ᵇ and 181ᶜ. The terminals of the stator exciting coils may be brought out through the stem 185 of the stator, as shown in said figure. It will be understood that in the embodiment of Figure 17 the stator and rotor teeth are of number, size, and spacing to conform to the requirements and functions already explained previously herein. The rotor teeth are provided in the form of the inwardly projecting elements 187 shown in this figure. The rotor cylindrical body may then be formed of non-magnetic material as shown.

I have thus shown and described various embodiments of the structural elements, principally the stator and rotor elements, of the present improvements, and have disclosed a number of tooth and related embodiments, comprising portions of such elements. I shall now disclose various improvements comprising portions of my present invention, whereby the proper current impulses may be delivered to the various stator coils in such sequence as to produce rotor rotation in the desired direction, the stator coils being supplied with current impulses in proper sequence and under control.

As a fundamental requirement it is seen that the current impulses must be delivered to the several stator coils in an orderly and predetermined sequence in order to effect rotor rotation in either direction. The successive impulses may be delivered to the stator coils at equal and predetermined intervals, or at unequal intervals, but in that order or sequence which corresponds to a desired direction of rotation. Or, as may sometimes happen, the impulses may come in what may be termed a two directional sequence, some of the impulses corresponding to rotation in one direction, and some to rotation in contrary direction. This might be true, for example, in an installation in which an algebraic sum of positive and negative digits was to be obtained, including therefore some impulses corresponding to forward rotation, and some corresponding to reverse rotation.

It is also to be noted that the impulses may be delivered to the stator coils under such controls as suggested above, either with the origination of the impulses at some remote location, and by an impulse generator completely independent of the motor itself, or said impulses may be created by the motor itself by means of some element or unit rotating in harmony with and under control of, the advancements of the rotor itself. Such an arrangement might take the form of a commutator element physically connected to and driven by the rotor, and provided with means and contacts whereby the connections to the stator coils would be effected in the manner and the sequence desired or required.

In Figure 5 I have shown the three stator coils as "A," "B" and "C," corresponding to the three coils of Figures 1 and 2, for example. These coils are shown in delta connection, for simplicity, and the three delta terminals are shown at 188, 189 and 190. These are brought to the switch contacts 191, 192 and 193 by which delivery of the three phase current to the three motor terminals in selected order is effected.

In Figure 20 I have shown another embodiment of a three phase current supply to the motor coils, and in this case I have chosen to illustrate a typical industrial application of the motor to a service for which it may be well adapted. In this case the motor is designated generally by the numeral 194, its stator coils by the numerals 195, 196 and 197, and the rotor shaft by the numeral 198. The coils are conveniently delta connected, their coil terminals being shown at 198, 199 and 200, respectively. The reversing control switch 201 is illustrated being connected in conventional manner for reversal of two of the supply phases in order to effect reversal of rotor rotation.

The motor illustrated in this figure is provided with a large number of stator and rotor teeth, so that the angular advance produced by each current impulse is correspondingly small. Furthermore this motor may be provided with the multiple tooth arrangement such as shown in Figures 7 and 8, or in Figures 15 and 16, or in Figures 18 and 19, so that even when using such large number of teeth per revolution and small angular advancement per step a high torque may be developed.

In Figure 20 the work to which this motor is connected comprises such an element as the machine tool table 202 riding on the ways 203 (only one of which is shown). The table is provided with the rack bar 204 which is engaged by the pinion 205 carried by the stub shaft 206. The coupling 207 connects the motor shaft 198 to this stub shaft 206 so that slight angular displacements may occur between the motor shaft and said stub shaft, but without permanent angular displacement of the two shafts with respect to each other. Thus, assuming that the work has a large mass and correspondingly large inertia, as the motor coil is subjected to a current impulse its advancement may immediately commence, the coupling yielding slightly to allow the rotor to get under way and develop torque and build up the force acting to accelerate the work, and the movement of the work may thus be increased while preventing any "stalling" of the rotor to occur. When the work has thus been accelerated to speed the delivery of the impulses to the stator coils, with the work under movement, will occur without material angular displacements occurring within the coupling itself. This general operation has been described on the assumption that the current supply to the motor is a conventional three phase supply. It will be evident, however, that similar advantages produced by the features of motor construction hereinbefore disclosed which enable production of high torques combined with relatively small angular advancements per impulse may be made available even when the impulses are delivered to the stator coils otherwise than as conventional three phase wave form impulses. For example, the impulses may be delivered at non-uniform intervals to such motor, from any suitable impulse generator, and under suitable controls, and as each step of the rotor is urged the torque developed will be large in comparison to the overall dimensions of the unit.

When the current is supplied to the motor unit by a non-impulse source, such as a battery or other D. C. supply, it is evident that provision must be made for causing the current to be delivered to the several stator coils in succession and according to the proper sequence in order to effect the continuous rotor advancement in selected direction. This may be done by provision of a suitable commutator having one of its elements drivingly connected to the rotor so that its position remains at all times phased with respect to the rotor itself. One simple form of such arrangement is shown schematically in Figure 4. In this case the stator coils are shown at "A," "B" and "C," and the drive shaft is indicated at 208. This shaft may be the motor shaft itself, or may be manually driven. It is shown as provided with the gear 209 driving the pinion 210 on the sub shaft 211 journalled in the bracket 212. This stub shaft carries the arm 213 extending radially from the disk portion 214. Said arm carries the brush carrier 215 which carries the inwardly reaching brush 216 which may ride on the commutator segments 217 of a stationary commutator unit 218 supported by the bracket 219. If desired such support of the unit 218 may be effected by a stub shaft 220 extended through the bracket so that angular adjustments of the unit 218 may be made to ensure correct energization of the various segments in phase with the rotor advancements. The stator coils are shown as being star connected with one end of each coil connected to the common terminal 221. The commutator unit 218 is provided with three segments so that each rotation of the stub shaft 211 by drive of the pinion 210 causes excitation of the three segments in proper sequence. The disk portion 214 of the element carried by the stub shaft 211 carries the circular contact 222 which is connected to the brush 216 by a suitable conductor, not shown in Figure 4. A brush 223 carried by the bracket 212 engages the said contact 222 to deliver or receive current during the entire rotation of the stub shaft 211 and pinion 210. A source of current, such as the battery 224 has its terminals connected by the leads 221 and 225 to the common terminal of the stator coils and to the brush 223. Thus each rotation of the pinion 210 under drive from the rotor element of the motor will ensure supply of current to the three stator coils "A," "B" and "C" in sequence. The correct timing of the coil energizations may be ensured by phasing the stub shaft 220 in the one direction or the other as needed.

Now it will be seen that each revolution of the pinion 210 corresponds to a complete cycle of excitations of the stator coils. Reference to the showing of Figures 1 and 2 shows that one "cycle" of the stator coil excitations must correspond to the angular distance between two consecutive stator teeth of any one of the sections "A," "B" and "C." Thus it is necessary, when supplying the current impulses to the stator coils by use of a commutator arrangement such as that of Figure 4, to ensure one complete rotation of the stub shaft 223 of the commutator unit of Figure 4 for each rotor advancement of amount equal to the angular displacement between the successive stator teeth. Therefore, when there are twelve stator teeth, requiring twelve corresponding rotor "full" advancements per revolution it is seen that the brush 223 of the commutator unit of Figure 4 must execute twelve complete revolutions per rotor complete revolution; and since there are three "rotor steps" per "full" advancement it is seen that there will actually be thirty-six "steps" of the rotor per complete revolution. Also, there will, under the assumed condition, be twelve rotations of the stub shaft 223 and brush 216 per rotor revolution, requiring a gear ratio of twelve to one as between the gear 209 and the pinion 210.

In Figure 6 I have shown schematically another form of commutator arrangement for ensuring delivery of the current impulses to the stator coils in proper sequence. In this case, however, the three stator exciting coils are each subdivided into two sections which are then centrally tapped. Thus each stator coil comprises in effect four sections which may be individually excited. Commutator bars are then provided corresponding to these coil sections, with suitable brush arrangements in connection with the commutator bars.

In this arrangement the three stator exciting coil units are designated as "A," "B" and "C"; and they are each composed of two sections, "AA," "AAA," "BB," "BBB," "CC" and "CCC." The exciting units are delta connected. To this end the proximate ends of the successive sections are connected together into a ring by the leads 226, 227 and 228, the subsections of each section being connected together by the leads 229, 230 and 231. There were then provided twelve commutator bars, two for each sub-section, numbered 232, 233, 234, 235, 236, 237, 238, 239, 240, 241, 242 and 243. The center points of the sub-sections are connected to the alternate commutator bars, as follows; AAA to 232; AA to 234; BBB to 236; BB to 238; CCC to 240; and CC to 242; by the leads 244, 245, 246, 247, 248 and 249, respectively. The ring leads 226, 227 and 228 are connected to the commutator bars 235, 239 and 243 by the leads 250, 251 and 252, respectively, and the ring leads 229, 230 and 231 are connected to the commutator bars 233, 237 and 241 by the leads 253, 254 and 255, respectively. For convenience of showing there are included the dashed lines at the sides of the leads 250, 251 and 252 to emphasize the division locations between the successive coil units "A," "B" and "C."

The commutator bars subtend equal angular embracements, being 30 degrees each, corresponding to the subsections. I have indicated the two slip rings 256 and 257 which rotate with the rotor element. The brushes 258 and 259 are connected to said slip rings by the leads 260 and 261, respectively, said brushes also being carried by and rotating with the rotor element. A source of D. C. is shown in the form of the battery 262. The terminals of this battery connect to the brushes 263 and 264 by the leads 265 and 266, respectively, said brushes bearing against the slip rings 256 and 257, respectively. Thus current is supplied through the stationary brushes 263 and 264 and the rotating slip rings 256 and 257, to the rotating brushes 258 and 259 to the stationary commutator bars, and from them to the stationary stator exciting coil sections. Conveniently the brushes 258 and 259 may be carried by a carrier which can be rocked about the rotor axis to thereby adjust the angular positions of these brushes as a pair, with respect to the angular positions of the rotor teeth, so as to ensure a proper and desired relation between the rotor teeth and the commutation points. The mechanical means to enable such angular adjustments are not herein illustrated since they may be of conventional form.

The structural details of the coil elements have not been illustrated in Figure 6. However, by reference to Figure 1 it will be apparent that each of the main coils "A",, "B" and "C" of Figure 1 may be divided into two sections by either a horizontal or a vertical plane of division, thus providing the two coil sections within a common annular space, and corresponding to the sections "AA" and "AAA" of Figure 6, for example, in place of the single unit "A" of Figure 1. Then the proper taps and connections may be provided to the coil sections so provided. The commutator and brush and slip ring elements may also be provided at one end of the motor unit according to well understood and conventional practice.

It will be seen that by such subdivisions of the main exciting coils as disclosed in Figure 6 it is possible to obtain an operation closely simulating the operating effects of supply of waveform currents such as shown in Figure 5, for example. Thus very smooth torque effects will be produced, but in combination with the novel functions herein disclosed.

I have stated that the shaft 208 shown in Figure 4 may comprise the motor shaft itself, so that with the disclosures of that figure it is possible to obtain self-commutation or proper progressive excitation of the various stator coils. In Figure 4 I have also shown the button 267 carried by said shaft 208 so that, when the unit of Figure 4 is not physically connected to the motor itself, the rotations and control of the shafts 208 and 211 may be effected manually, producing the desired current impulses which will then be correctly delivered to the stator coils and in proper sequence and controlled timing. Thus a remote control of the excitations of the stator coils will be produced, the several coils "A," "B" and "C" of Figure 4 being located in the motor and at a distance from the unit shown in Figure 4. This is also true of the arrangement shown in Figure 6.

Reference may now be had to Figures 22 and 23 in which I have shown another embodiment similar in general to that shown in Figure 4. In the case of Figures 22 and 23 the motor is generally designated as 268ª, and the various gear elements, commutator and brush unit, and similar parts are designated by numerals generally the same as used in Figure 4. However, in the present case I have shown the commutator as provided with double the number of segments shown in Figure 4, being six in number; and I have shown these segments 268, 269, 270, 271, 272 and 273 as cross connected in opposite pairs by the leads 274, 275 and 276. These cross connections are then connected to the free ends of the stator exciting coils "A," "B" and "C" by the leads 277, 278 and 279, respectively. The other ends of the coils are then connected to the common lead 280, comprising one side of the source of current. The other side of such source of current connects by the lead 281 to the brush 282 which bears against the commutator. The current is thus supplied to the several stator coils in proper sequence.

In Figure 22 I have shown the commutator shaft 220 as provided with the phasing handle 283 so that the phasing of the commutator bars may be readily adjusted from time to time by a simple adjustment. It will be noted that by such phasing adjustment from one operating position, to and through the neutral brush position, to an operating position at the opposite side of such neutral position, it is possible to actually reverse the motor operation. Furthermore, by adjustment of the phasing it is possible to produce operations in which the excitations of the several stator coils are carried beyond the rotor positions of exact registration of rotor teeth with the stator teeth, so that overlaps are produced in the torque forces developed on the rotor. If the phasing setting of such commutator shaft be such that current is cut off from one coil at the condition of exact registry of the rotor teeth of such motor section with the stator teeth of such motor section, with simultaneous excitation of the stator coil next in the sequence, it is evident that no dragging effect will be produced by an "overstaying" of the excitation of the earlier coil after the position of exact registry of the teeth has occurred. By shifting the handle 283, however, far enough, such an overstaying operation may be produced, with corresponding hold-back on the rotor element. Such an operation may be desired for certain operations.

Referring again to Figure 23 I have therein shown a capacitor 284 and resistor 285 connected in series shunt with each of the stator coils "A", "B" and "C." By selection of proper impedance values for these capacitors and resistors, in comparison to the impedance effects of the so bridged excitation coils, it is possible to produce time constants for the excitations of the main coils, to ensure either fast or slow excitation responses of the magnetic effects produced between the rotor and stator teeth. Thereby it is possible to ensure either very fast responses, corresponding to ability to produce very quick rotor advancements, or the responses may be substantially slowed down, thus producing a correspondingly slow rotor response to each excitation or signal.

It will now be illuminating to consider some modes of operation of the motor of Figure 22 with the circuit arrangements of Figure 23. First let us consider that the motor is under heavy load both frictional and inertial. Now if the input terminals are connected to direct current and with the phasing handle 283 in the proper position, the motor will slowly accelerate in a given direction. The motor will continue to accelerate until the impedance of the coils will not allow enough of a current rise in a motor section when the teeth are in the best relation to exert sufficient force for further acceleration. By adjusting the phasing handle so that the commutator will allow current to be switched to the coils so that the current will have time to rise to a sufficient maximum while the rotor and stator teeth are at an optimum relation will also further increase acceleration.

If now the phasing handle 283 is further adjusted so that the flux becomes a maximum as the rotor teeth are leaving the stator teeth of the successive sections, a braking action will take place and the rotor will be rapidly decelerated. If the phasing handle is left in this position, the motor will go through the stationary position and begin to accelerate in a reverse direction. If desired, however, a further adjustment of the phasing handle when the rotor is substantially stationary will cause the commutator to switch current to the section where the stator and rotor teeth are in alignment and the rotor will lock in such position. In these operations of the motor the capacitors will serve primarily in an anti-sparking capacity or function.

The motor of Figure 22 may also be operated by connecting the input terminals to a source of pulses of current. The motor in this case advances one step for each pulse, the phasing lever being properly set. If the motor is intended for counting pulses, there being little or no external load on the motor, it may be desirable to improve its manner of operation by adding an appropriate frictional load to the motor by means of the frictional clutch 317 (shown in Figure 22). This comprises the stationary brake disk 318 carried by the stationary stud 319, together with the rotor shaft driven friction disk 320 which is spring pressed against the disk 318 by the adjustable spring 321.

Without such a frictional load, when the rotor has been accelerated by the current pulse, the inertia can carry the rotor considerably beyond the alignment of stator teeth and rotor teeth. The duration of the current must therefore be longer so that the rotor does not continue to rotate and is brought back to the proper position for the next pulse. With the frictional load, however, the duration of the pulse may be a maximum, and therefore the rate of counting may be increased, the frictional load being chosen of a value which is optimum to give this result.

For a counting operation the capacitors may perform an additional function to that of preventing sparking of the commutator contacts. With capacitors of correct capacity the duration of the input pulses need be only long enough to charge the capacitor in circuit at each pulse. The current from the capacitor can then be sufficient to ensure completion of the corresponding step of the rotor. Thus pulses of short duration can be counted as well as pulses of longer duration.

The speed at which the motor may count depends on the rapidity with which the rotor can make a step. The steps can be exceedingly rapid when the rotor has a low inertia and a small angular movement per step. Although the duration of a pulse to make the motor advance one step may be exceedingly short when use is made of the capacitors, the current delivery through the coil must be of such short duration that it has ceased when the movement of the rotor has brought the contactor elements to their next position of circuitry. When the next capacitor is charged, the rotor will advance another step. In line with the foregoing, if direct current is applied to the motor under the foregoing conditions, the motor will advance step-by-step at a substantially constant rate. This rate can be controlled by the size of the capacitors used, the larger capacitors being associated with the lower rates.

The control arrangements so far described serve to supply to the stator coils current impulses of regularly recurring kind. It is to be noted, however, that various important uses of motors embodying the features of invention include the delivery of single pulses or groups of pulses, to the coils, to thereby produce corresponding rotor advances for such purposes as counting, and the like. I shall now describe certain embodiments whereby the impulses may be severally controlled from a distance, as during the counting of digits, recording various steps of an operation, and like purposes. Reference may be had to Figures 21, 24, 25 and 26 disclosing one such embodiment.

In Figure 26 I have shown the three stator coils "A," "B" and "C" (together with the capacitors and resistors such as shown in Figure 23 bridged across each stator coil). I have also shown, schematically, the leads 286, 287 and 288 extending leftward from the free ends of these coils, and the common return lead 289 connected to the right-hand ends of the coils. The lead 289 connects to one side of a source of D. C. current, such as the battery 290. Each of the leads 286, 287 and 288 may be considered as representing a development of a circular conductor, with the ten contacts 291 connected to each of such circular or ring shaped conductors. For clarity I have designated these contacts 291 as 291$^a$, 291$^b$, and 291$^c$ for the three conductors 286, 287 and 288, respectively. In this figure I have also shown the movable sets of contacts 292, 293 and 294 for the contacts 291 of the three sets connected to the three conductors 286, 287 and 288. For clarity I have designated these contacts 292, 293 and 294 with the suffixes "a," "b" and "c," corresponding to the conductors 286, 287 and 288, respectively. The three contacts of each of these sets are carried by a common carrier which may move from station to station along the conductors 286, 287 and 288 (actually moving circularly since the conductors 286, 287 and 288 actually comprise circular conductors as above explained. These carriers actually rotate in harmony with the rotor rotations). The contacts 292$^a$, 292$^b$ and 292$^c$, are connected to a common lead 295, the contacts 293$^a$, 293$^b$ and 293$^c$, are connected to a common lead 296, and the contacts 294$^a$, 294$^b$ and 294$^c$, are connected to a common lead 297. The free end of the source of current, the battery, is connected by the lead 298 to the three switch elements 299, 300 and 301, respectively, which control connection of the lead 298 with the three leads 295, 296 and 297, respectively.

Examination of Figure 26 will show that the contacts 291 are vertically aligned with each other in sets, each set including a contact to each of the leads 286, 287 and 288. Also, that the movable contacts 292 are stepped rightwardly, counting downwardly from the lead 286 to the lead 287, to the lead 288; that the contacts 293 are also stepped rightwardly, counting downwardly from the lead 286 to the lead 287, to the lead 288; and that the contacts 294 are also stepped rightwardly, counting downwardly from the lead 286 to the lead 287, to the lead 288. These steppings or spacings are such that when the contact 292$^a$ is engaged with one of the contacts 291$^a$, the other contacts 293$^a$ and 294$^a$ are set back one-third of the spacing between the successive contacts 291$^a$, and two-thirds of such spacing, respectively, so that rightward movement of the carrier will first open the contact 292$^a$ from one of the contacts 291$^a$ with which it was engaged, then will bring the contact 293$^a$ into engagement with one of the contacts 291$^a$, then will open the contact 293$^a$ from such contact 291$^a$, and finally will bring the contact 294$^a$ into engagement with one of the contacts 291$^a$, then will open the contact 294$^a$ from such contact 291$^a$. Examination of this figure will also show that similar contacting engagement and disengagement will occur for the other carrier contacts "b" and "c" in regular order through the groups.

In the position shown in Figure 26 the contact 292$^a$ is seen to be engaged with the contact 291$^a$, the contact 293$^b$ with the contact 291$^b$, and the contact 294$^c$ with the contact 291$^c$. All of the switches 299, 300 and 301 are however, open. Accordingly, none of the circuits to the coils "A," "B" and "C" is actually closed. Reference will now be made to Figure 1 to complete the description and understanding of the operation now being described.

In Figure 1 is is seen that the left-hand rotor section is in such position that upon energizing the stator coil "A" the rotor will be drawn clockwise to bring the teeth of such left-hand rotor section into complete registry with the corresponding stator teeth. Accordingly, by closing the switch 299 (of Figure 26), with energization of the stator coil "A," the rotor will be moved substantially one-third of a tooth spacing to bring the left-hand rotor section teeth into complete registry with the corresponding stator teeth; and at the same time the rotor teeth of the central section will move clockwise away from the stator teeth with which they have been registered, and the rotor teeth of the right-hand section "C" will move clockwise into position preparatory to being drawn into registry with the next set of stator teeth of the section "C" under proper excitation conditions. Therefore, if after having closed the switch 299 just long enough to cause such stepping advancement of the rotor, such switch now be opened and then the switch 299 be again closed a further forward step of the rotor will occur since such second closing of the switch 299 will now energize the stator coil "C" (the contacts 292$^c$, 293$^c$ and 294$^c$ having been advanced rightwardly by the first operation). Finally a third such closing of the switch 299 will result in a third clockwise step of the rotor, the carrier having been shifted rightwardly a still further step. Thus, successive closings and openings of the switch 299 will result in successive clockwise steppings of the rotor. It should be here noted that in case the switch 299 should be held in its closed position the rotor will continue to step rightwardly or clockwise by steps at a rate dependent on various of the rate affecting conditions which have been previously discussed hereinbefore.

Further exploration of the operations of this arrangement will show that successive closings and openings of the switch 301 will result in successive counterclockwise steppings of the rotor element. Also, that closing of the switch 300 will result merely in exciting the stator coil "B" at which motor section the rotor teeth are completely registered with the stator poles, thus producing no torque action, and merely serving to magnetically lock the rotor in its then position.

It will be understood that the switches 299, 300 and 301 may be located at any convenient control position, and may be operated by any suitable device with which the motor is to be combined and operated.

In Figures 21, 24 and 25 I have shown in fragmentary form a mechanical structure capable of effectuating the proper contact movements to enable functioning according to the operations just explained in connection with the description of Figure 26. The rotor shaft 302 is extended sufficiently to carry the insulating sleeve 303 on which are mounted the three slip rings 295$^b$, 296$^b$ and 297$^b$. The source of current—the battery 290 in the present case—is shown in Figure 21, with one terminal connected to the lead 298. Also, the three switches 299, 300 and 301 are shown in Figure 21. The brushes 295$^a$, 296$^a$ and 297$^a$ of Figure 21 correspond to portions of the leads 295, 296 and 297 of Figure 26. These brushes engage the slip rings 295$^b$, 296$^b$ and 297$^b$, which slip rings in turn connect to the leads 295$^c$, 296$^c$ and 297$^c$ extending inwardly through the shaft (which is provided with a suitable bore to accommodate said leads). The other terminal of the battery connects to the lead 289. For simplicity of illustration and to avoid confusion I have shown only the stator coil "A" in this figure, and I have also shown only the contacts needed to control that coil's excitation.

The arcuate segment 286$^a$ simulates a portion of the lead 286 shown in Figure 26. Said segment carries the inwardly extending contact fingers 291$^{aa}$, corresponding to the contacts 291$^a$ of Figure 26. A disk of insulation material 304 is carried by the shaft of the rotor; and the three contact fingers 292$^{aa}$, 293$^{aa}$ and 294$^{aa}$, extend outwardly from such disk within a plane normal to the axis of rotation, and substantially in line with the contacts 291$^{aa}$. These fingers 292$^{aa}$, 293$^{aa}$ and 294$^{aa}$ are spaced with respect to each other according to the principles already explained with respect to the spacing of the contacts 292, 293 and 294 with respect to each other and with respect to the contacts 291$^{aa}$ of the ring element 286$^a$. It will be understood that in actuality the other stator coils "B" and "C" would also be connected to the lead 289, that two other ring shaped conductors similar to the conductor 286 would be provided with their inwardly extending fingers, and that two other sets of the fingers 292$^{aa}$, 293$^{aa}$ and 294$^{aa}$ would be provided, connected to the leads 295$^c$, 296$^c$ and 297$^c$, respectively. Thus the schematic showing of Figure 26 would be duplicated in a physical structure of which Figure 26 is but a portion. It is thus unnecessary to describe the operation of the showing of Figure 21 further.

Figures 24 and 25 are a fragmentary longitudinal section through the arrangement shown in Figure 21, and a fragmentary cross-section corresponding thereto. Their description in detail is deemed unnecessary in view of what has already been explained.

It is remarked that in the showing of Figure 26 I have included the capacitor and resistor combinations bridged across the several stator coils, acording to the principles described in connection with the showing of Figure 23.

In Figures 27 and 28 I have shown another arrangement for effecting a "commutation" of the current impulses to the several stator coils in proper sequence. In this case I have shown the rotor shaft 305 carrying the disk of insulating material 306 at a location outside of the stator housing. The three microswitches 307, 308 and 309 are mounted to a convenient element around the disk 306. These microswitches are provided with small buttons which are engaged by an element to reverse their biased spring leaf contacts according to conventional designs. I have not shown these details in Figures 27 and 28, beyond showing the buttons 310 projecting slightly beyond the switch housings. The disk 306 is provided with dwells 311, 312 and 313 around its periphery, and other dwells not numbered are also shown. The microswitches are set at positions around the disk 306 such that the several microswitches will be actuated in proper sequence to produce the desired sequence and timing of the excitations of the stator coils. In view of the detailed descriptions already given it is deemed unnecessary to further describe the present arrangement.

In Figure 29 I have shown another modified means to produce desired time delay constants in the operations of the stator coils. In this case I have shown the capacitor 314 bridged across a portion of the coil, and another capacitor 315 and resistor 316 in series bridged across the entire body of the coil. The effects of such an arrangement will be readily understood by one skilled in the arts.

In the modified construction shown in Figures 30 and 31 the shaft 322 finds bearing in the end bearings 323 (only one being shown in Figure 30), which bearings are carried by the end plates 324 (only one being shown) of the stator element. The stator shell 325 is supported by these end plates in convenient manner, and preferably this shell is formed of non-magnetic material such as plastic or the like, as shown in Figure 30.

The rotor includes the end sections 326 (only one being shown), and the intermediate sections 327 (only one being shown). These sections 326 and 327 are provided in their proximate faces with annular recesses 328 which register with each other when the rotor sections have been brought together, to provide annular passages within which are located the exciting coils 329 for the several motor sections. Only two of these exciting coils are shown, being designated as 329a and 329b for purposes of convenience.

The rotor sections are provided with outwardly extending flange portions 330 which reach out to radii close to the inside surface of the stator shell 325; and the peripheral portions of these flanges are laterally extended to provide the polar elements or teeth 331. Reference to Figure 31 will show that said lateral extensions are discontinuous to provide these teeth, instead of being continuous rings. Extending inwardly from, or set within the stator shell there are the rings 332, 333 and 334 (only two being shown in Figure 30). These are formed of magnetic material and have the inwardly radially extending teeth 335 (as shown in Figure 31) which lie at the same radius from the axis of rotation as the teeth 331. Thus it will be seen that each motor section includes poles and sub-poles (the teeth 335 comprising portions of such sub-poles). It will also be apparent that the air-gap between the teeth or poles 331 of each motor section is divided primarily by the poles or teeth 335, into two sub-gaps. I have also provided the two rings 336 and 337 set into the stator shell in locations registering with such sub-gaps; and these rings, of magnetic material, are provided with the inwardly radially extending teeth 337. Each rotor section is provided with the two ring shaped elements 338 and 339 of non-magnetic material, which elements, while registering axially with each other do not come together, but rather they leave an annular opening axially registered with the corresponding ring 332. These rings 338 and 339 carry the outwardly extending rotor teeth 340 and 341 which travel in the gaps or sub-gaps provided by the structural elements already described. The exciting coils are supported by the rings of non-magnetic material 342 supported by the inner ends of the proximate teeth, as will be readily apparent from Figure 30.

With this arrangement it is seen that although the exciting coils are stationary and are supported by the stator element, nevertheless the outer polar elements or teeth of each section are provided by and comprise portions of the rotor element. Thus the flux path includes the moving portions of the rotor, and the stationary sub-teeth carried by the stator element, as well as the movable teeth of the rotor element. By this scheme it is possible to gain the advantages of the modified arrangement of Figure 18, without the attendant disadvantage of a large air-gap in the return portion of the magnetic circuit.

It is not deemed necessary to describe the order of teeth advancements shown in Figure 31, as it is felt that this operation will be well understood from various of the earlier descriptions.

I have referred to the use of laminated pole and tooth constructions for reduction of eddy current losses and other well understood advantages. Such type of construction will generally be found advantageous for frequencies of substantially 400 C. P. S. For very high frequencies it may be found desirable to use polar and tooth constructions formed of sintered finely granular magnetic material highly compacted by large pressures, as is well understood in the magnetic arts. Such forms of construction may be found desirable for use with frequencies of the order of 1000 C. P. S. and higher.

I claim:

1. In an electric motor the combination of stator and rotor elements, means to journal said elements coaxially with respect to each other, the stator element including a plurality of axially aligned field generating sections of circular form, each field generating section including a plurality of sets of axially oppositely disposed spaced apart pairs of poles located equidistant from the journal axis, the sets of poles of each section being spaced at equal angular spacings around such section and the sets of poles of each section being angularly displaced from the sets of poles of both of the other sections by an amount equal to the angular spacing of the poles of the set multiplied by one divided by the number of sections, a magnetizing coil for the sets of poles of each section, the poles of each set being spaced apart axially to provide a polar gap between the opposite poles of each set, at least one interpole of magnetic material in each polar gap and subdividing said polar gap into a plurality of axially aligned sub-gaps, the rotor element including a tooth carrier for each section, a set of radially extending teeth of magnetic material carried by each tooth carrier, corresponding to each sub-gap, the rotor teeth of each last named set lying in a plane normal to the axis of rotation and passing through such sub-gap, whereby magnetic flux flowing between the stator poles of any section flows across the sub-gaps of such section, and through the interpoles of such section, and through the rotor teeth of such section, and means to supply current to the magnetizing coils of all of the sections according to a predetermined sequence.

2. Means as defined in claim 1, together with means to determine the sequential order of supply of the current to the magnetizing coils of the sections.

3. Means as defined in claim 1, wherein the current supplied to the coils of the sections comprises pulses of current.

4. Means as defined in claim 3, wherein the pulses of current supplied to the several coils do not overlap in time sequence.

5. Means as defined in claim 3, wherein the pulses of current supplied to the several coils overlap in time sequence.

6. Means as defined in claim 5, wherein the pulses of current supplied to the several coils comprise wave form currents in sequential timing in the several coils.

7. Means as defined in claim 1, wherein the means to supply current to the magnetizing coils according to a predetermined sequence includes a supply source of polyphase current, together with means to connect the several magnetizing coils to the several supply phases corresponding to the coils.

8. Means as defined in claim 12, wherein the stationary carrier of the stator element is of greater radial dimension than the teeth of the rotor element and includes pole carrying parts extending radially inwardly and in which the teeth on the tooth carriers of the rotor element project radially outwardly to positions in axial alignment with the poles of the stator element, and wherein the magnetizing coils of the stator element are not of greater radial dimension than the radial dimension of the tooth carriers of the rotor element.

9. Means as defined in claim 8, wherein the tooth carriers of the rotor element comprise non-magnetic material, and wherein the teeth carried by said carriers comprise magnetic material.

10. Means as defined in claim 1, together with a stationary carrier of the stator element of smaller radial dimension than the teeth of the rotor element and including pole carrying parts extending radially outwardly and in which the teeth on the tooth carriers of the rotor element project radially inwardly to positions in axial alignment with the poles of the stator element, and wherein the magnetizing coils of the stator element are of smaller radial dimension than the radial dimension of the tooth carriers of the rotor element.

11. Means as defined in claim 10, wherein the tooth carriers of the rotor element comprise non-magnetic material, and wherein the teeth carried by said carriers comprise magnetic material.

12. Means as defined in claim 1, wherein the stator element includes a stationary carrier, and wherein the sets of axially oppositely disposed pairs of poles and the interpoles are in connection with said stationary carrier, and wherein the magnetizing coils are supported by said carrier.

13. Means as defined in claim 12, wherein the stationary carrier of the stator element is of greater radial dimension than the teeth of the rotor element and includes pole and interpole carrying parts extending radially inwardly and in which the teeth on the tooth carriers of the rotor element project radially outwardly to positions in axial alignment with the poles and interpoles of the stator element, and wherein the magnetizing coils of the stator element are of greater radial dimension than the radial dimension of the tooth carriers of the rotor element.

14. Means as defined in claim 13, together with ring shaped elements of non-magnetic material extending between the sets of poles of each section, and wherein the interpoles of such section extend inwardly in the polar gaps of such section and have their outer ends in supporting engagement with such ring shaped element of non-magnetic material, and wherein said ring shaped elements of non-magnetic material define the inner confines of annular passages wherein the magnetizing coils are accommodated.

15. Means as defined in claim 13, wherein the tooth carriers of the rotor element comprise hub members of non-magnetic material of radial dimension not greater than the radially inwardly extending pole carrying parts of the stator element, and wherein the rotor teeth project radially outwardly from said hub members.

16. Means as defined in claim 14, wherein the stationary carrier of the stator element comprises a series of ring shaped units of magnetic material of substantially equal radial dimensions and having their proximate end portions of form to cooperate with each other for production of annular passages in substantial planar alignment with the tooth carriers of the rotor element, and to produce exterior flux carrying flanges cooperating with each other from unit to unit, and wherein the magnetizing coils are accommodated between the said exterior flux carrying flanges and the ring shaped elements of non-magnetic material.

17. Means as defined in claim 12, wherein the stationary carrier of the stator element is of smaller radial dimension than the teeth of the rotor element and includes pole and interpole carrying parts extending radially outwardly and in which the teeth on the tooth carriers of the rotor element project radially inwardly to positions in axial alignment with the poles and interpoles of the stator element, and wherein the magnetizing coils of the stator element are of smaller radial dimension than the radial dimension of the tooth carriers of the rotor element.

18. Means as defined in claim 17, together with ring shaped elements of non-magnetic material extending between the sets of poles of each section, and wherein the interpoles of such section extend outwardly in the polar gaps of such section and have their inner ends in supporting engagement with such ring shaped element of non-magnetic material, and wherein said ring shaped elements of non-magnetic material define the outer confines of annular passages wherein the magnetizing coils are accommodated.

19. Means as defined in claim 1, wherein the poles of the stator section comprise laminations lying in planes extending substantially parallel to and including the axis of rotation.

20. Means as defined in claim 1, wherein the teeth of the rotor element comprise laminations lying in planes extending substantially parallel to and including the axis of rotation.

21. Means as defined in claim 20, wherein the poles of the stator element comprise laminations lying in planes extending substantially parallel to and including the axis of rotation.

22. Means as defined in claim 1, wherein said predetermined sequence corresponding to the rotary movements of the rotor and stator elements to successive angular positions with respect to each other in which successive angular positions the teeth of the several rotor sections occupy determined angular positions with respect to the poles of the stator sections corresponding to said rotor sections, said sequence determining coil current supply means including a current supply lead in connection with at least one end of each magnetizing coil, a series of switching contacts in connection with said current supply leads, means to actuate each switching contact to its circuit closed position in synchronism with the arrival of the teeth of the corresponding rotor section at such determined angular position with respect to the poles of the stator section corresponding to such rotor section, and means to actuate each switching contact to its circuit open position in synchronism with the arrival of the teeth of the corresponding rotor section at another position with respect to the poles of the stator section corresponding to such rotor section.

23. Means as defined in claim 22, together with means to retain the switching contacts in fixed position with respect to the stator element, wherein the means to actuate the switching contacts to closed circuit and open circuit positions includes means to move said actuating means harmoniously with the rotary movements of the rotor element.

24. Means as defined in claim 23, wherein the switching contacts comprise contact elements of microswitches and wherein said microswitches are retained in fixed positions with respect to the stator element, and wherein the means to actuate the switching contacts comprises a cam element and a driving connection between said cam element and the rotor element.

25. Means as defined in claim 22, wherein the switching contacts comprise commutator segments and means to retain said commutator segments in fixed positions with respect to the corresponding current supply leads, and wherein the means to actuate each switching contact to closed and open circuit positions comprises a commutator brush, means to supply current to said brush, and means to advance said brush from commutator segment to commutator segment harmoniously with the rotary movements of the rotor element.

26. Means as defined in claim 25, wherein the means to advance the brush from commutator segment to commutator segment harmoniously with the rotary movements of the rotor element comprises a driving connection between the rotor element and said brush.

27. Means as defined in claim 22, wherein the switching contacts comprise commutator segments and means to retain said commutator segments in fixed angular position with respect to each other, and wherein the means to actuate each switching contact to closed and open circuit positions comprises a commutator brush, and means to advance said brush from commutator segment to commutator segment harmoniously with the rotary movements of the rotor element, together with manual means to change the positions of the commutator segments angularly with respect to the stator element.

28. Means as defined in claim 22, wherein the switching contacts comprise commutator segments and means to retain said commutator segments in fixed angular position with respect to each other, and wherein the means to actuate each switching contact to closed and open circuit positions comprises a commutator brush, and remote control means to advance said brush from commutator segment to commutator segment.

29. Means as defined in claim 22, together with connections between each current supply lead and one end of another magnetizing coil, and wherein the switching contacts comprise commutator segments and means to retain said commutator segments in fixed positions with respect to the corresponding current supply leads, and wherein the means to actuate each switching contact to closed and open positions comprises a commutator brush, and means to advance said brush from commutator segment to commutator segment harmoniously with the rotary movements of the rotor element.

30. Means as defined in claim 29, together with another lead in connection with the central portion of each magnetizing coil, and another commutator segment in connection with each such lead.

References Cited in the file of this patent
UNITED STATES PATENTS

| | | |
|---|---|---|
| 166,431 | Tittman | Aug. 3, 1875 |
| 1,275,665 | Eichbaum | Aug. 13, 1918 |
| 1,353,025 | Chicken et al. | Sept. 14, 1920 |
| 1,367,679 | Adsit et al. | Feb. 8, 1921 |
| 1,440,729 | French | Jan. 2, 1923 |
| 1,728,692 | Michl | Sept. 17, 1929 |
| 1,945,511 | Bercot | Feb. 6, 1934 |
| 2,343,325 | Ranseen | Mar. 7, 1944 |
| 2,578,648 | Thomas | Dec. 11, 1951 |
| 2,579,231 | Goldberg et al. | Dec. 18, 1951 |
| 2,631,264 | Thomas | Mar. 10, 1953 |